United States Patent
Kobayashi et al.

(10) Patent No.: US 7,582,352 B2
(45) Date of Patent: Sep. 1, 2009

(54) LAYERED PRODUCT OLEFIN FOAM AND USE

(75) Inventors: Kyoko Kobayashi, Ichihara (JP); Akira Uchiyama, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 32 days.

(21) Appl. No.: 10/069,603

(22) PCT Filed: Jun. 29, 2001

(86) PCT No.: PCT/JP01/05623

§ 371 (c)(1),
(2), (4) Date: Feb. 28, 2002

(87) PCT Pub. No.: WO02/02316

PCT Pub. Date: Jan. 10, 2002

(65) Prior Publication Data

US 2002/0155275 A1    Oct. 24, 2002

(30) Foreign Application Priority Data

Jun. 30, 2000 (JP) ............................. 2000-203088
Jun. 30, 2000 (JP) ............................. 2000-203089

(51) Int. Cl.
 B32B 27/32    (2006.01)
 B29C 39/12    (2006.01)
(52) U.S. Cl. .............. 428/319.3; 428/319.7; 428/319.9; 428/317.9; 264/415; 264/419; 264/478
(58) Field of Classification Search .............. 428/304.4, 428/317.9, 318.6, 319.3, 319.7, 319.9; 521/79, 521/81, 134; 264/415, 419, 478
See application file for complete search history.

(56) References Cited

U.S. PATENT DOCUMENTS

| | | | | | |
|---|---|---|---|---|---|
| 3,624,964 | A | * | 12/1971 | Bordner et al. | ............ 49/475.1 |
| 3,929,026 | A | * | 12/1975 | Hofmann | .................... 198/847 |
| 5,120,587 | A | * | 6/1992 | McDermott et al. | ........ 428/40.6 |
| 6,160,029 | A | * | 12/2000 | Chaudhary et al. | .......... 521/139 |
| 6,221,963 | B1 | * | 4/2001 | Kobayashi et al. | .......... 525/191 |
| 6,303,666 | B1 | * | 10/2001 | Yorita et al. | .................. 521/79 |

(Continued)

FOREIGN PATENT DOCUMENTS

EP    0 360 577 A    3/1990

(Continued)

*Primary Examiner*—Hai Vo
(74) *Attorney, Agent, or Firm*—Birch, Stewart, Kolasch & Birch, LLP

(57) ABSTRACT

The foamed laminate based on olefin according to the present invention is composed of a substrate layer of a foamed body made of either an ethylenic thermoplastic elastomer comprising a polyethylene resin and an ethylene/α-olefin copolymer having a Mooney viscosity $ML_{1+4}$ (100° C.) of 90-250 and an ethylene content of 70-95 mole % or an ethylenic thermoplastic elastomer composition comprising 100 parts by weight of an olefinic thermoplastic elastomer and 1-20 parts by weight of an olefinic thermoplastic resin and, under lamination thereon, a skin layer made of either an ultrahigh molecular weight polyolefin resin having an intrinsic viscosity of 3.5-8.3 dl/g or made of an olefinic thermoplastic elastomer composition comprising an olefinic thermoplastic elastomer and a lubricant. The foamed laminate according to the present invention is easy in recycled use, obtainable at a high foaming expansion ratio with soft hand touch and is superior in the appearance, abrasion resistance, durability and sliding performance.

32 Claims, 2 Drawing Sheets

U.S. PATENT DOCUMENTS

| | | | |
|---|---|---|---|
| 6,497,960 B1 * | 12/2002 | Kobayashi et al. | 428/421 |
| 6,500,561 B1 * | 12/2002 | Yoshida et al. | 428/492 |
| 6,589,664 B1 * | 7/2003 | Kobayashi et al. | 428/516 |

FOREIGN PATENT DOCUMENTS

| | | |
|---|---|---|
| EP | 0 371 743 A2 | 6/1990 |
| EP | 0 860 314 A1 | 8/1998 |
| EP | 0 974 617 A1 | 1/2000 |
| EP | 976782 A1 * | 2/2000 |
| EP | 1095764 A2 * | 5/2001 |
| JP | 7-241948 A | 9/1995 |
| JP | 9-156009 A | 6/1997 |
| JP | 9-156053 A | 6/1997 |
| JP | 9-174727 A | 7/1997 |
| JP | 10-6895 A | 1/1998 |

* cited by examiner

LAYERED PRODUCT OLEFIN FOAM AND USE

This application is the national phase under 35 U.S.C. § 371 of PCT International Application No. PCT/JP01/05623 which has an International filing date of Jun. 29, 2001, which designated the United States of America.

FIELD OF THE INVENTION

The present invention relates to a foamed laminate based on olefin, in which a foamed body of an olefinic thermoplastic elastomer is used for the substrate layer and an ultrahigh molecular weight polyolefin resin or an olefinic thermoplastic elastomer composition is used for the skin layer, and use thereof.

BACKGROUND OF THE INVENTION

As a technique for producing foamed articles of elastomer (vulcanized rubber), a process has hitherto been known, in which a vulcanizing agent and a foaming agent are admixed to natural rubber or a synthetic rubber and kneaded, whereupon the resulting kneaded mass is formed into a contemplated shape, followed by heating to effect vulcanization and foaming to obtain a foamed article of elastomer.

By the above-mentioned prior technique, however, it is necessary for forming the said rubber into a predetermined shape by continuous extrusion to perform preliminarily a process step of kneading a composite blend together with the rubber to obtain the kneaded mass before the continuous extrusion and to carry out thereafter a process step of forming the kneaded mass into a form of ribbon preliminarily for facilitation of easy supply of the kneaded mass to the extruding machine before the continuous kneading. Thus, the prior technique as given above is disadvantageous in the industrial production, since the production process steps are intricate and, in addition, considerable time is required for both the process steps of vulcanization and of foaming.

As a technique for solving such problems, there is a method of using, for example, a thermoplastic resin, such as an ethylene/vinyl acetate copolymer, low density polyethylene or so on, or a partially cross-linked thermoplastic elastomer constituted of an olefinic copolymer rubber and an olefinic resin. According to this method, the process steps mentioned above can be dispensed with.

However, thermoplastic resins and thermoplastic elastomers conventionally used have problems that inferior appearance may be apt to occur due to the tendency to occurrence of defoaming upon the foaming molding and that the foaming expansion ratio of the foamed article is lower, as amounting only to about 1.5 times, whereby a harder hand touch will result.

Further, when a part element subject to repeated sliding or a partial component subject to contact with human or materials, such as weather strip or sealing element on window sash for automobile, is produced from a conventional foamed body, it may difficultly be served for practical use as a sliding element or the like by inferior durability thereof due to the poor resistance to abrasion and lower sliding performance thereof.

An object of the present invention is to solve the problems concomitant with the prior technique mentioned above and to provide a foamed laminate based on olefin which is made of an olefinic polymer premitting recycled use and obtainable at a high foaming expansion ratio and, thus, exhibits a soft hand touch and which is superior in the appearance, in the resistance to abrasion, in the durability and in the sliding performance, in particular, is superior in the resistance to abrasion under a difficult condition.

Another object of the present invention is to provide a sliding element, an automotive weather strip and a sealing element for architectural use, made of the above-mentioned foamed laminate based on olefin.

DISCLOSURE OF THE INVENTION

The present invention resides in the following foamed laminate based on olefin and use thereof:

(1) A foamed laminate based on olefin in which
  a substrate layer, consisting of a foamed body ($X_F$) of an olefinic thermoplastic elastomer (X), and
  a skin layer made of the resin or the thermoplastic elastomer composition given below are laminated:
  Y: an ultrahigh molecular weight polyolefin resin having an intrinsic viscosity ($\eta$) of 3.5-8.3 dl/g as determined in decalin at 135° C.
  Z: an olefinic thermoplastic elastomer composition comprising an olefinic thermoplastic elastomer (C) and a lubricant ($Z_L$).

(2) A foamed laminate based on olefin in which
  a substrate layer, consisting of a foamed body ($X_F$) of an olefinic thermoplastic elastomer (X), and
  a skin layer made of the resin or the thermoplastic elastomer composition given below are laminated:
  Y: an ultrahigh molecular weight polyolefin resin having an intrinsic viscosity ($\eta$) of 3.5-8.3 dl/g as determined in decalin at 135° C.
  Z: an olefinic thermoplastic elastomer composition which comprises, per 100 parts by weight of an olefinic thermoplastic elastomer (C), at least one kind of lubricant ($Z_L$) selected from the group consisting of 0.5-25 parts by weight of an organopolysiloxane (D), 0.5-10 parts by weight of a fluorine-containing polymer (E), 0.5-10 parts by weight of an antistatic agent (F), 5-200 parts by weight of a polyolefin resin (G), 0.01-5 parts by weight of a fatty acid amide, 0.5-10 parts by weight of a mineral oil, 0.01-5 parts by weight of a metal soap, 0.01-5 parts by weight of an ester, 0.01-5 parts by weight of calcium carbonate and 0.01-5 parts by weight of a silicate, each in a proportion as given above.

(3) The foamed laminate as defined in the above (1) or (2), wherein the olefinic thermoplastic elastomer (X) is one which has a compression set of 60% or less, as determined according to JIS K 6262 (70° C., 22 hours), and a melt flow rate of 0.1 g/10 min. or higher, as determined according to JIS K 7120 (230° C., 10 kg load).

(4) A foamed laminate based on olefin in which
  a substrate layer, consisting of a foamed body ($X_{F1}$) of an ethylenic thermoplastic elastomer (A) made from 5-60 parts by weight of a polyethylene resin (a-1) and 40-95 parts by weight of a copolymer based on ethylene/α-olefin (a-2), with the said constituents (a-1) and (a-2) summing up to 100 parts by weight, and
  a skin layer made of an ultrahigh molecular weight polyolefin resin (Y)

are laminated,
  wherein the said copolymer based on ethylene/α-olefin (a-2) is a copolymer of ethylene, an α-olefin and, optionally incorporated, non-conjugated polyene and has a Mooney viscosity $ML_{1+4}$ (100° C.) of 90-250 and an ethylene content of 70-95 mole % and wherein the said ultrahigh molecular weight polyolefin resin (Y) is one which has an intrinsic viscosity (η) of 3.5-8.3 dl/g as determined in decalin at 135° C.

(5) A foamed laminate based on olefin in which a substrate layer, consisting of a foamed body ($X_{F1}$) of an ethylenic thermoplastic elastomer (A) made from 5-60 parts by weight of a polyethylene resin (a-1) and 40-95 parts by weight of a copolymer based on ethylene/α-olefin (a-2), with the said constituents (a-1) and (a-2) summing up to 100 parts by weight, and a skin layer made of an olefinic thermoplastic elastomer composition (Z)

are laminated, wherein the said copolymer based on ethylene/α-olefin (a-2) is a copolymer of ethylene, an α-olefin and, optionally incorporated, non-conjugated polyene and has a Mooney viscosity $ML_{1+4}$ (100° C.) of 90-250 and an ethylene content of 70-95 mole % and wherein the said olefinic thermoplastic elastomer composition (Z) is one which comprises, per 100 parts by weight of an olefinic thermoplastic elastomer (C), at least one kind of lubricant ($Z_L$) selected from the group consisting of 0.5-25 parts by weight of an organopolysiloxane (D), 0.5-10 parts by weight of a fluorine-containing polymer (E), 0.5-10 parts by weight of an antistatic agent (F), 5-200 parts by weight of a polyolefin resin (G), 0.01-5 parts by weight of a fatty acid amide, 0.5-10 parts by weight of a mineral oil, 0.01-5 parts by weight of a metal soap, 0.01-5 parts by weight of an ester, 0.01-5 parts by weight of calcium carbonate and 0.01-5 parts by weight of a silicate, each in a proportion as given above.

(6) A foamed laminate based on olefin in which a substrate layer, consisting of a foamed body ($X_{F1}$) of an ethylenic thermoplastic elastomer (A) made from 5-60 parts by weight of a polyethylene resin (a-1) and 40-95 parts by weight of a copolymer based on ethylene/α-olefin (a-2), with the said constituents (a-1) and (a-2) summing up to 100 parts by weight, and a skin layer made of an olefinic thermoplastic elastomer composition ($Z_1$)

are laminated, wherein the said copolymer based on ethylene/α-olefin (a-2) is a copolymer of ethylene, an α-olefin and, optionally incorporated, non-conjugated polyene and has a Mooney viscosity $ML_{1+4}$(100° C.) of 90-250 and an ethylene content of 70-95 mole % and wherein the said olefinic thermoplastic elastomer composition ($Z_1$) is one which comprises, per 100 parts by weight of an olefinic thermoplastic elastomer (C), at least one kind selected from the group consisting of 0.5-25 parts by weight of an organopolysiloxane (D), 0.5-10 parts by weight of a fluorine-containing polymer (E) and 0.5-10 parts by weight of an antistatic agent (F), each in a proportion as given above.

(7) A foamed laminate based on olefin in which a substrate layer, consisting of a foamed body ($X_{F1}$) of an ethylenic thermoplastic elastomer (A) made from 5-60 parts by weight of a polyethylene resin (a-1) and 40-95 parts by weight of a copolymer based on ethylene/α-olefin (a-2), with the said constituents (a-1) and (a-2) summing up to 100 parts by weight, and a skin layer made of an olefinic thermoplastic elastomer composition ($Z_2$)

are laminated, wherein the said copolymer based on ethylene/α-olefin (a-2) is a copolymer of ethylene, an α-olefin and, optionally incorporated, non-conjugated polyene and has a Mooney viscosity $ML_{1+4}$ (100° C.) of 90-250 and an ethylene content of 70-95 mole % and wherein the said olefinic thermoplastic elastomer composition ($Z_2$) is one which comprises, per 100 parts by weight of an olefinic thermoplastic elastomer (C), a polyolefin resin (G) in an amount of 5-200 parts by weight.

(8) A foamed laminate based on olefin in which a substrate layer, consisting of a foamed body ($X_{F1}$) of an ethylenic thermoplastic elastomer (A) made from 5-60 parts by weight of a polyethylene resin (a-1) and 40-95 parts by weight of a copolymer based on ethylene/α-olefin (a-2), with the said constituents (a-1) and (a-2) summing up to 100 parts by weight, and a skin layer made of an olefinic thermoplastic elastomer composition ($Z_3$)

are laminated, wherein the said copolymer based on ethylene/α-olefin (a-2) is a copolymer of ethylene, an α-olefin and, optionally incorporated, non-conjugated polyene and has a Mooney viscosity $ML_{1+4}$ (100° C.) of 90-250 and an ethylene content of 70-95 mole % and wherein the said olefinic thermoplastic elastomer composition ($Z_3$) is one which comprises, per 100 parts by weight of an olefinic thermoplastic elastomer (C), at least one kind selected from the group consisting of 0.5-25 parts by weight of an organopolysiloxane (D), 0.5-10 parts by weight of a fluorine-containing polymer (E), 0.5-10 parts by weight of an antistatic agent (F), 0.01-5 parts by weight of a fatty acid amide, 0.5-10 parts by weight of a mineral oil, 0.01-5 parts by weight of a metal soap, 0.01-5 parts by weight of an ester, 0.01-5 parts by weight of calcium carbonate and 0.01-5 parts by weight of a silicate, each in a proportion given above, and further comprises a polyolefin resin (G) in an amount of 5-200 parts by weight.

(9) The foamed laminate based on olefin as defined in any one of the above (5) to (8), wherein the olefinic thermoplastic elastomer (C) is one which is obtained by a dynamic heat treatment of a mixture comprising a crystalline polyolefin resin (c-1) and a rubber (c-2).

(10) The foamed laminate based on olefin as defined in the above (5), (7) or (8), wherein the polyolefin resin (G) is an ultrahigh molecular weight polyolefin resin (Y).

(11) The foamed laminate based on olefin as defined in the above (4), (5), (7), (8) or (10), wherein the ultrahigh molecular weight polyolefin resin (Y) comprises 15-40 parts by weight of an ultrahigh molecular weight polyolefin resin (y-1) having an intrinsic viscosity (η) of 10-40 dl/g as determined in decalin at 135° C. and 85-60 parts by weight of a polyolefin resin (y-2) having an intrinsic viscosity (η) of 0.1-5 dl/g as determined in decalin at 135° C., with the said constituents (y-1) and (y-2) summing up to 100 parts by weight.

(12) The foamed laminate based on olefin as defined in any one of the above (4) to (11), wherein the ethylenic thermoplastic elastomer (A) comprises a polypropylene resin (a-3) in an amount of 30 parts by weight or less, per 100 parts by weight of the total sum of the polyethylene resin (a-1) and the copolymer based on ethylene/α-olefin (a-2).

(13) The foamed laminate based on olefin as defined in any one of the above (4) to (12), wherein the foaming expansion ratio of the foamed body ($X_{F1}$) is at least twofold.

(14) The foamed laminate based on olefin as defined in any one of the above (4) to (13), wherein the ethylenic thermoplastic elastomer (A) consists of a thermoplastic elastomer obtained by subjecting a mixture of the polyethylene resin (a-1) and the copolymer based on ethylene/α-olefin (a-2) or a mixture which contains further, on requirement, the polypropylene resin (a-3) to a dynamic heat treatment in the absence of cross-linking agent.

(15) The foamed laminate based on olefin as defined in any one of the above (5) to (14), wherein the olefinic thermoplastic elastomer (C) is one which is obtained by subjecting a mixture comprising the crystalline polyolefin resin (c-1) and the rubber (c-2) to a dynamic heat treatment in the presence of a cross-linking agent.

(16) The foamed laminate based on olefin as defined in any one of the above (4) to (15), wherein the foamed body ($X_{F1}$) is one which is obtained by subjecting a foamable ethylenic thermoplastic elastomer composition ($X_1$) comprising the ethylenic thermoplastic elastomer (A) and the foaming agent (B) to foaming.

(17) The foamed laminate based on olefin as defined in the above (16), wherein the foaming agent (B) is an organic or inorganic foaming agent of a thermal decomposition type.

(18) The foamed laminate based on olefin as defined in the above (16) or (17), wherein the content of the foaming agent (B) is 0.5-20 parts by weight per 100 parts by weight of the ethylenic thermoplastic elastomer (A).

(19) The foamed laminate based on olefin as defined in any one of the above (4) to (18), wherein the ethylenic thermoplastic elastomer (A) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load).

(20) A foamed laminate based on olefin in which
a substrate layer, consisting of a foamed body ($X_{F2}$) made of an olefinic thermoplastic elastomer composition ($X_2$) comprising 100 parts by weight of an olefinic thermoplastic elastomer (J) and 1-20 parts by weight of an olefinic thermoplastic resin (K), and
a skin layer made of an ultrahigh molecular weight polyolefin resin (Y)

are laminated,
wherein the said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with the said constituents (j-1) and (j-2) summing up to 100 parts by weight, to a dynamic heat treatment,
the said olefinic thermoplastic resin (K) is one which has an olefin content of 50-100 mole % and a melt flow rate (ASTM D-1238-65T, 230° C., 2.16 kg load) of 0.01-2 g/10 min. and
the said ultrahigh molecular weight polyolefin resin (Y) is one which has an intrinsic viscosity (η) of 3.5-8.3 dl/g determined in decalin at 135° C.

(21) A foamed laminate based on olefin in which
a substrate layer, consisting of a foamed body ($X_{F2}$) made of an olefinic thermoplastic elastomer composition ($X_2$) comprising 100 parts by weight of an olefinic thermoplastic elastomer (J) and 1-20 parts by weight of an olefinic thermoplastic resin (K), and
a skin layer made of an olefinic thermoplastic elastomer composition (Z)

are laminated,
wherein the said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with the said constituents (j-1) and (j-2) summing up to 100 parts by weight, to a dynamic heat treatment,
the said olefinic thermoplastic resin (K) is one which has an olefin content of 50-100 mole % and a melt flow rate (ASTM D-1238-65T, 230° C., 2.16 kg load) of 0.01-2 g/10 min. and
the said olefinic thermoplastic elastomer composition (Z) is one which comprises, per 100 parts by weight of an olefinic thermoplastic elastomer (C), at least one kind of lubricant ($Z_L$) selected from the group consisting of 0.5-25 parts by weight of an organopolysiloxane (D), 0.5-10 parts by weight of a fluorine-containing polymer (E), 0.5-10 parts by weight of an antistatic agent (F), 5-200 parts by weight of a polyolefin resin (G), 0.01-5 parts by weight of a fatty acid amide, 0.5-10 parts by weight of a mineral oil, 0.01-5 parts by weight of a metal soap, 0.01-5 parts by weight of an ester, 0.01-5 parts by weight of calcium carbonate and 0.01-5 parts by weight of a silicate, each in a proportion as given above.

(22) A foamed laminate based on olefin in which
a substrate layer, consisting of a foamed body ($X_{F2}$) made of an olefinic thermoplastic elastomer composition ($X_2$) comprising 100 parts by weight of an olefinic thermoplastic elastomer (J) and 1-20 parts by weight of an olefinic thermoplastic resin (K) and
a skin layer made of an olefinic thermoplastic elastomer composition ($Z_1$)

are laminated,
wherein the said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with the said constituents (j-1) and (j-2) summing up to 100 parts by weight, to a dynamic heat treatment,
the said olefinic thermoplastic resin (K) is one which has an olefin content of 50-100 mole % and a melt flow rate (ASTM D-1238-65T, 230° C., 2.16 kg load) of 0.01-2 g/10 min. and
the said olefinic thermoplastic elastomer composition ($Z_1$) is one which comprises, per 100 parts by weight of an olefinic thermoplastic elastomer (C), at least one kind selected from the group consisting of 0.5-25 parts by weight of an organopolysiloxane (D), 0.5-10 parts by weight of a fluorine-containing polymer (E) and 0.5-10 parts by weight of an antistatic agent (F), each in a proportion as given above.

(23) A foamed laminate based on olefin in which
a substrate layer, consisting of a foamed body ($X_{F2}$) made of an olefinic thermoplastic elastomer composition ($X_2$) comprising 100 parts by weight of an olefinic thermoplastic elastomer (J) and 1-20 parts by weight of an olefinic thermoplastic resin (K), and
a skin layer made of an olefinic thermoplastic elastomer composition ($Z_2$)

are laminated,
wherein the said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with the said constituents (j-1) and (j-2) summing up to 100 parts by weight, to a dynamic heat treatment, the said olefinic thermoplastic resin (K) is one which has an olefin content of 50-100 mole % and a melt flow rate (ASTM D-1238-65T, 230° C., 2.16 kg load) of 0.01-2 g/10 min. and the said olefinic thermoplastic elastomer composition ($Z_2$) is one which comprises, per 100 parts by weight of an olefinic thermoplastic elastomer (C), a polyolefin resin (G) in an amount of 5-200 parts by weight.

(24) A foamed laminate based on olefin in which a substrate layer, consisting of a foamed body ($X_{F\ 2}$) made of an olefinic thermoplastic elastomer composition ($X_2$) comprising 100 parts by weight of an olefinic thermoplastic elastomer (J) and 1-20 parts by weight of an olefinic thermoplastic resin (K), and a skin layer made of an olefinic thermoplastic elastomer composition ($Z_3$)

are laminated, wherein the said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with the said constituents (j-1) and (j-2) summing up to 100 parts by weight, to a dynamic heat treatment, the said olefinic thermoplastic resin (K) is one which has an olefin content of 50-100 mole % and a melt flow rate (ASTM D-1238-65T, 230° C., 2.16 kg load) of 0.01-2 g/10 min. and wherein the said olefinic thermoplastic elastomer composition ($Z_3$) is one which comprises, per 100 parts by weight of an olefinic thermoplastic elastomer (C), at least one kind selected from the group consisting of 0.5-25 parts by weight of an organopolysiloxane (D), 0.5-10 parts by weight of a fluorine-containing polymer (E), 0.5-10 parts by weight of an antistatic agent (F), 0.01-5 parts by weight of a fatty acid amide, 0.5-10 parts by weight of a mineral oil, 0.01-5 parts by weight of a metal soap, 0.01-5 parts by weight of an ester, 0.01-5 parts by weight of calcium carbonate and 0.01-5 parts by weight of a silicate, each in a proportion given above, and further comprises a polyolefin resin (G) in an amount of 5-200 parts by weight.

(25) The foamed laminate based on olefin, as defined in any one of the above (21) to (24), wherein the olefinic thermoplastic elastomer (C) is one which is obtained by a dynamic heat treatment of a mixture comprising a crystalline polyolefin resin (c-1) and a rubber (c-2).

(26) The foamed laminate based on olefin as defined in the above (21), (23) or (24), wherein the polyolefin resin (G) is an ultrahigh molecular weight polyolefin resin (Y).

(27) The formed laminate based on olefin as defined in the above (20), (21), (23), (24) or (26), wherein the ultrahigh molecular weight polyolefin resin (Y) comprises 15-40 parts by weight of an ultrahigh molecular weight polyolefin resin (y-1) having an intrinsic viscosity (η) of 10-40 dl/g as determined in decalin at 135° C. and 85-60 parts by weight of a polyolefin resin (y-2) having an intrinsic viscosity (η) of 0.1-5 dl/g as determined in decalin at 135° C., with the said constituents (y-1) and (y-2) summing up to 100 parts by weight.

(28) The foamed laminate based on olefin, as defined in any one of the above (20) to (27), wherein the polyolefin resin (j-1) of the olefinic thermoplastic elastomer (J) is a polypropylene resin.

(29) The foamed laminate based on olefin, as defined in any one of the above (20) to (28), wherein the olefinic thermoplastic elastomer (J) comprises further 10-200 parts by weight of a softening agent (j-3) per 100 parts by weight of the ethylene/α-olefin copolymer rubber (j-2).

(30) The foamed laminate based on olefin, as defined in any one of the above (20) to (29), wherein the olefinic thermoplastic elastomer (J) is a thermoplastic elastomer composition obtained by subjecting a mixture comprising the polyolefin resin (j-1) and the ethylene/α-olefin copolymer rubber (j-2) or a mixture which comprises further, optionally incorporated, the softening agent (j-3) to a dynamic heat treatment in the presence of a cross-linking agent.

(31) The foamed laminate based on olefin, as defined in any one of the above (20) to (30), wherein the olefinic thermoplastic resin (K) is an isotactic polypropylene or a propylene/α-olefin copolymer.

(32) The foamed laminate based on olefin, as defined in any one of the above (20) to (31), wherein the foamed body ($X_{F\ 2}$) is one which is obtained by foaming an olefinic foamable composition ($X_3$) comprising 100 parts by weight of the olefinic thermoplastic elastomer (J), 1-20 parts by weight of the olefinic thermoplastic resin (K) and the forming agent (B).

(33) The foamed laminate based on olefin, as defined in the above (32), wherein the foaming agent (B) is an organic or an inorganic foaming agent of heat-decomposition type.

(34) The foamed laminate based on olefin, as defined in the above (32) or (33), wherein the content of the foaming agent (B) is in the range of 0.5-20 parts by weight per 100 parts by weight of total sum of the olefinic thermoplastic elastomer (J) and the olefinic thermoplastic resin (K).

(35) The foamed laminate based on olefin, as defined in any one of the above (20) to (34), wherein the foaming expansion ratio of the foamed body ($X_{F\ 2}$) is at least twofold.

(36) The foamed laminate based on olefin, as defined in any one of the above (21) to (35), wherein the olefinic thermoplastic elastomer (C) is one which is obtained by subjecting a mixture comprising the crystalline polyolefin resin (c-1) and the rubber (c-2) to a dynamic heat treatment in the presence of a cross-linking agent.

(37) The foamed laminate based on olefin, as defined in any one of the above (20) to (36), wherein the olefinic thermoplastic elastomer composition ($X_2$) is one which has a compression set of 60% or less as determined according to JIS K 6262 (70° C., 22 hours) and a melt flow rate of 0.1 g/10 min. or higher as determined according to JIS K 7120 (230° C., 10 kg load).

(38) A sliding element made of the foamed laminate based on olefin as defined in any one of the above (1) to (37).

(39) A weather strip for automobile made of the foamed laminate based on olefin as defined in any one of the above (1) to (37).

(40) A sealing material for architectural use made of the foamed laminate based on olefin as defined in any one of the above (1) to (37).

THE BEST MODE FOR EMBODYING THE INVENTION

The Olefinic Thermoplastic Elastomer (X)

Figure 1:
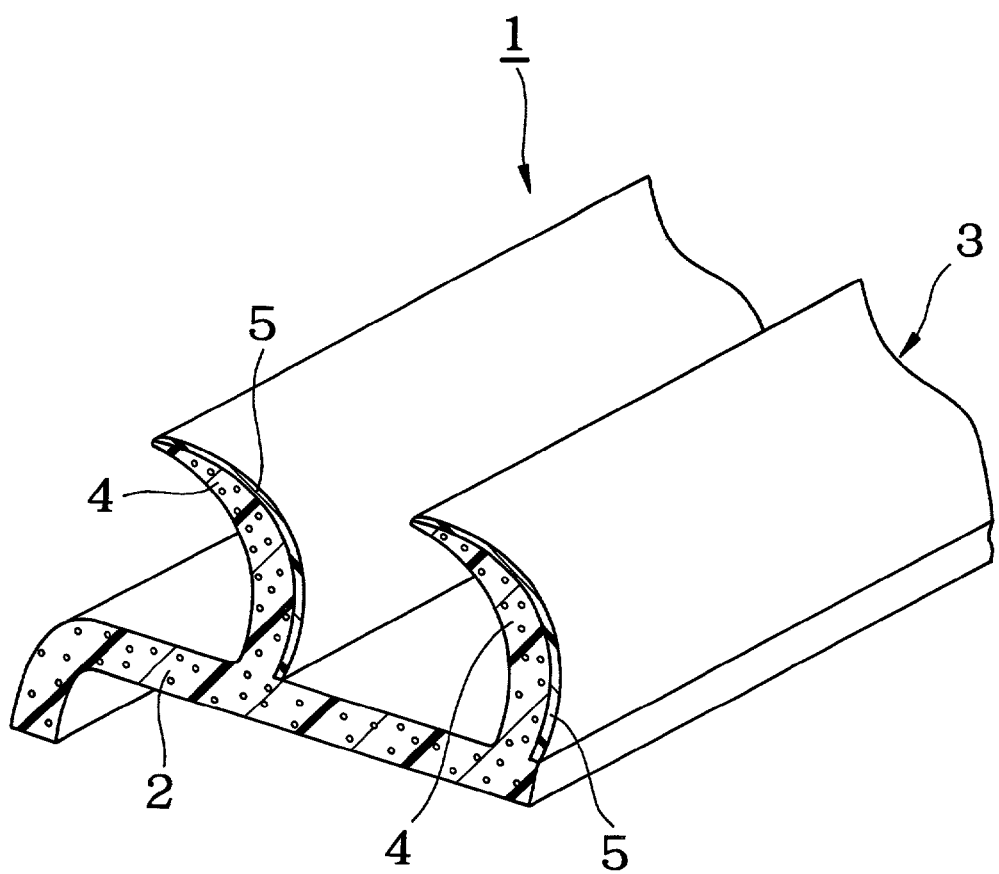
FIG. 1 shows a weather strip comprising the foamed laminate based on olefin according to the present invention in a perspective view, in which a cross section is shown by the front face.

The olefinic thermoplastic elastomer (X) to be used as the raw material of the substrate layer according to the present invention may preferably be constituted usually of a polymer based on olefin and may have a compression set of 60% or less, preferably in the range from 15 to 55%, as determined according to JIS K 6262 (70° C., 22 hours) and a melt flow rate of 0.1 g/10 min. or higher, preferably in the range from 1 to 300 g/10 min., as determined according to JIS K 7120.

The polymer based on olefin which constitutes the olefinic thermoplastic elastomer (X) may favorably consist of a homopolymer of an olefin having usually 2-30 carbon atoms, preferably 2-20 carbon atoms, a copolymer of an olefin or a copolymer of an olefin with other comonomer, wherein it is possible to use two or more of them concurrently. As the comonomer, there may be exemplified α-olefins, cycloolefins, conjugated polyenes and non-conjugated polyenes. Among them, α-olefins and non-conjugated polyenes are particularly preferred. It is permissible to incorporate other monomers, such as vinyl acetate and ethyl acrylate, within the range of not more than 10 mole %.

The olefinic thermoplastic elastomer (X) may be constituted of a mixture of two or more olefinic polymers. For the olefinic thermoplastic elastomer (X), mixtures of one or more olefinic polymers having lower comonomer content with one or more olefinic polymers having higher comonomer content are especially preferred.

For the olefinic thermoplastic elastomer (X), there is no special restriction as to whether it is cross-linked or not, so long as the compression set and the melt flow rate thereof satisfy the above-mentioned condition.

For the olefinic thermoplastic elastomer (X) to be used according to the present invention, preference is given to, for example, an ethylenic thermoplastic elastomer (A) composed of 5 to 60 parts by weight of a polyethylene resin (a-1) and 40 to 95 parts by weight of a copolymer (a-2) based on ethylene/α-olefin, with the total of the components (a-1) and (a-2) summing up to 100 parts by weight, and an olefinic thermoplastic elastomer composition ($X_2$) comprising 100 parts by weight of an olefinic thermoplastic elastomer (J) and 1 to 20 parts by weight of an olefinic thermoplastic resin (K), as will be described afterwards.

The olefinic thermoplastic elastomer (X) to be used according to the present invention may further comprise, on requirement, known additives, such as softening agent, thermal stabilizer, antioxidant, weathering stabilizer, filler, coloring agent and lubricant, in addition to the above-mentioned olefinic polymer(s), so long as the above-mentioned condition as to the compression set and melt flow rate is satisfied as a whole.

The substrate layer of the foamed laminate based on olefin according to the present invention is constituted of a foamed body ($X_F$) obtained by foaming the above-mentioned olefinic thermoplastic elastomer (X) using a foaming agent (B), exemplified concretely by a foamed body ($X_{F1}$) and a foamed body ($X_{F2}$), as will be described afterwards.

The skin layer of the foamed laminate based on olefin according to the present invention is made of an ultrahigh molecular weight polyolefin resin (Y) having an intrinsic viscosity (η) in the range from 3.5 to 8.3 dl/g, as determined in decalin at 135° C., or an olefinic thermoplastic elastomer composition (Z) comprising an olefinic thermoplastic elastomer (C) and a lubricant ($Z_L$), which will be described afterwards in detail.

The Lubricant ($Z_L$)

For the lubricant ($Z_L$) to be used as a raw material of the skin layer according to the present invention, known ones to be incorporated in widely recognized plastic resins can be employed. For example, those which are described on pages 1037-1038 of the Chemical Handbook, Practical Edition, 2nd Revision, edited by the Chemical Society of Japan, issued from Maruzen K. K. in 1973, may be used. Concretely, there may be recited, for example, organopolysiloxanes (D), fluorine-containing polymers (E), antistatic agents (F), polyolefin resins (G), fatty acid amides, mineral oils, metal soaps, esters, calcium carbonate and silicates. Among them, organo-polysiloxanes (D), fluorine-containing polymers (E), antistatic agents (F), polyolefin resins (G) and fatty acid amides are preferred, wherein special preference is given to organopolysiloxanes (D), fluorine-containing polymers (E), antistatic agents (F) and polyolefin resins (G). It is also preferable to select among organopolysiloxanes (D), fluorine-containing polymers (E), polyolefin resins (G) and fatty acid amides. Also, there may be exemplified a mode of concurrent use of at least one selected from the group consisting of organopolysiloxanes (D), fluorine-containing polymers (E), antistatic agents (F), fatty acid amides, mineral oils, metal soaps, esters, calcium carbonate and silicates together with a polyolefin resin (G), wherein it is preferable to use concurrently a polyolefin resin (G) with at least one kind selected from the group consisting of organopolysiloxanes (D), fluorine-containing polymers (E) and antistatic agents (F). It is also preferable to use concurrently a polyolefin resin (G) with at least one selected from the group consisting of organopolysiloxanes (D), fluorine-containing polymers (E) and fatty acid amides. Here, it is to be noted that some components of the lubricant ($Z_L$) may also be used as a softening agent and it is possible that a softening agent to be compounded with the olefinic thermoplastic elastomer (C) is the same with or different from a component, such as for example, a mineral oil, to be incorporated as the lubricant ($Z_L$).

The Ethylenic Thermoplastic Elastomer (A)

The ethylenic thermoplastic elastomer (A) to be used preferably as a raw material of the substrate layer according to the present invention is composed of 5-60 parts by weight, preferably 10-50 parts by weight, of a polyethylene resin (a-1) and 40-95 parts by weight, preferably 50-90 parts by weight, of a copolymer based on ethylene/α-olefin (a-2), wherein the total of the components (a-1) and (a-2) sums up to 100 parts by weight. The ethylenic thermoplastic elastomer (A) may contain, if necessary, a polypropylene resin (a-3).

The ethylenic thermoplastic elastomer (A) to be used according to the present invention may preferably be an olefinic thermoplastic elastomer obtained by subjecting a mixture containing the polyethylene resin (a-1) and the copolymer based on ethylene/α-olefin (a-2) in the above-mentioned proportion or a mixture containing further, on requirement, the polypropylene resin (a-3) to a dynamic heat treatment in the absence of cross-linking agent, as will be described afterwards. The ethylenic thermoplastic elastomer (A) may favorably be such one which has a compression set (70° C., 22 hours) of 60% or less, preferably 15-55%, as determined according to JIS K 6262, and a melt flow rate (230° C., 10 kg load) of 0.1 g/10 min. or higher, preferably 1-300 g/10 min., and more preferably 1-100 g/10 min., as determined according to JIS K 7120. When the contents of the polyethylene resin (a-1) and of the copolymer based on ethylene/α-olefin (a-2) are in the above-mentioned ranges, a superior rubbery elasticity is revealed.

As the polyethylene resin (a-1) to be used according to the present invention, known ones, such as high density polyethylene, medium density polyethylene, linear low density polyethylene and low density polyethylene, may be employed without any restriction, wherein a linear low density polyethylene is preferred and, in particular, a linear low density polyethylene obtained by polymerization using a metallocene catalyst is preferred.

The polyethylene resin (a-1) may favorably have a melt flow rate (MFR; ASTM D-1238, 190° C., 2.16 kg load) of 0.01-100 g/10 min., preferably 0.01-50 g/10 min. An ultra-high molecular weight polyethylene having an MFR lower than 0.1 g/10 min. has usually an intrinsic viscosity (η) of 7-40 dl/g, as determined in decalin (decahydronaphthalene) at 135° C. When such an ultrahigh molecular weight polyethylene is used as the polyethylene resin (a-1), it is favorable to use it in a form of an ultrahigh molecular weight resin composition comprising 15-40% by weight of a polyethylene of from lower to higher molecular weight having an intrinsic viscosity (η) of 0.1-5 dl/g, as determined in decalin at 135° C., and 85-60% by weight of an ultrahigh molecular weight polyethylene having an intrinsic viscosity (η) of 7-40 dl/g, wherein the ultrahigh molecular weight polyethylene resin composition may preferably have, as a whole, an intrinsic viscosity (η) of 3.5-8.3 dl/g.

The polyethylene resin (a-1) may favorably have a density of 0.880-0.980 g/cm$^3$, preferably 0.900-0.950 g/cm$^3$.

In case a linear low density polyethylene is used as the polyethylene resin (a-1), it is favorable to use a linear low density polyethylene having an MFR (ASTM D-1238, 190° C., 2.16 kg load) of 0.1-30 g/10 min, preferably 0.2-20 g/10 min., and a density of 0.880-0.950 g/cm$^3$, preferably 0.910-0.940 g/cm$^3$.

When a linear low density polyethylene is used as the polyethylene resin (a-1), a substrate layer with scarce tendency to occurrence of surface roughness and to formation of adherent surface, as compared with the case where a high density polyethylene or a medium density polyethylene is used, can be obtained.

The polyethylene resin (a-1) may be either a homopolymer of ethylene or a copolymer of ethylene with small proportion, such as for example, 10 mole % or less, of other comonomer. For such other comonomer, there may be exemplified α-olefins having 3-20 carbon atoms, preferably 3-8 carbon atoms, and vinyl monomers, such as vinyl acetate and ethyl acrylate. As the α-olefin to be used for such other comonomer, there may be exemplified propylene, 1-butene, 4-methyl-1-pentene, 1-hexene and 1-octene. These other comonomers may be used either individually or in a combination of two or more of them.

The polyethylene resin (a-1) may be used either individually or in a combination of two or more.

The copolymer based on ethylene/α-olefin (a-2) to be used according to the present invention may be one which has a Mooney viscosity $ML_{1+4}$(100° C.) of 90-250, preferably 100-200, more preferably 110-180, and an ethylene content of 70-95 mole %, preferably 75-90 mole %, more preferably 75-85 mole %. Here, the ethylene content does mean a content of ethylene with respect to the total α-olefins (inclusive of also ethylene).

The copolymer based on ethylene/α-olefin (a-2) may either be a copolymer constituted of ethylene and an α-olefin having 3-20 carbon atoms, preferably 3-8 carbon atoms, or may further contain co-polymerized comonomer(s) other than the α-olefin. For the comonomer(s) other than the α-olefin, there may be exemplified non-conjugated polyenes and the like. The copolymer based on ethylene/α-olefin (a-2) may be either a random copolymer or a block-copolymer.

For concrete ones of the copolymer based on ethylene/α-olefin (a-2), there may be recited, for example, ethylene/α-olefin copolymers and ethylene/α-olefin/non-conjugated polyene copolymers. Among them, preference is given to ethylene/α-olefin/non-conjugated polyene copolymers.

In the copolymers based on ethylene/α-olefin (a-2), there may be recited for the α-olefin to be co-polymerized with ethylene, for example, propylene, 1-butene, 1-pentene, 4-methyl-1-pentene, 1-hexene and 1-octene. Such α-olefins may be used either each solely or in a combination of two or more of them.

In the copolymer based on ethylene/α-olefin (a-2), there may be enumerated as the non-conjugated polyene to be co-polymerized with ethylene and the α-olefin, for example, non-conjugated dienes, such as dicyclopentadiene, 1,4-hexadiene, cyclooctadiene, methylenenorbornene and ethylidenenorbornene. The non-conjugated polyenes may be used either each alone or in a combination of two or more of them. The copolymer of ethylene/α-olefin/non-conjugated polyene has usually an iodine value of 0.1-50, preferably 5-30.

The copolymer based on ethylene/α-olefin (a-2) may be used either individually or in a combination of two or more kinds.

For the polypropylene resin (a-3), known polypropylene resins may be used without any restriction. Concretely, the polypropylene resins etc. given below may be exemplified:

1) Homopolymers of propylene,
2) Random copolymers of 90 mole % or more of propylene with less than 10 mole % of other α-olefin (random copolymer of propylene/α-olefin) and
3) Block-copolymers of 70 mole % or more of propylene with less than 30 mole % of other α-olefin (block-copolymer of propylene/α-olefin).

As the said other α-olefin to be co-polymerized with propylene, there may be enumerated concretely, for example, α-olefins having 2-20 carbon atoms, preferably 2-8 carbon atoms, such as ethylene, 1-butene, 4-methyl-1-pentene, 1-hexene and 1-octene.

For the polypropylene resins (a-3), the above-mentioned homopolymers of propylene 1) and the random copolymers of propylene/α-olefin 2) are preferable, wherein those which have MFRs (ASTM D-1238, 230° C., 2.16 kg load) of 0.1-50 g/10 min. are particularly preferred.

The polypropylene resins (a-3) may be used either each individually or in a combination of two or more of them.

The content of the polypropylene resin (a-3) in the ethylenic thermoplastic elastomer (A) to be used according to the present invention may favorably be, in general, 30 parts by weight or less, preferably 2-30 parts by weight, more preferably 5-20 parts by weight, per 100 parts by weight of the total amount of the polyethylene resin (a-1) and the copolymer based on ethylene/α-olefin (a-2).

When the content of the polypropylene resin (a-3) is in the above-mentioned range, the substrate layer obtained will be superior in the appearance due to scarce tendency to occurrence of surface roughness and, in addition, reveals a scarce sticky touch.

The ethylenic thermoplastic elastomer (A) to be used according to the present invention is superior in the rubbery elasticity even without being subjected to cross linking (vulcanization) using a cross-linking agent and cross-linking assistant. The ethylenic thermoplastic elastomer (A) to be used according to the present invention is not an elastomer of conventional thermosetting type, such as vulcanized rubber, but is a thermoplastic elastomer and permits easily recycled utilization. It does require no use of cross-linking agent and permits, thus, to dispense with a working step of kneading of such cross-linking agent, whereby it can be obtained simply and efficiently by recourse to one single process step of dynamic heat treatment and thus at a lower price.

The ethylenic thermoplastic elastomer (A) to be used according to the present invention may contain, on requirement, various known additives, such as softening agent, heat-resisting stabilizer, antioxidant, weathering stabilizer, antistatic agent, filler, coloring agent and lubricant, in amounts within the range not obstructing the purpose of the present invention.

As the softening agent to be compounded with the ethylenic thermoplastic elastomer (A) according to the present invention, a softening agent based on mineral oil may favorably be used. The softening agent may be admixed preliminarily to the copolymer based on ethylene/α-olefin (a-2) in a form of extender oil. For such a softening agent based on mineral oil, it is favorable to use a paraffinic, naphthenic or aromatic softening agent which is used usually in rubbers.

Production of ethylenic thermoplastic elastomer (A)

The ethylenic thermoplastic elastomer (A) to be used according to the present invention can be produced by mixing the polyethylene resin (a-1), the copolymer based on ethylene/α-olefin (a-2) and resins and additives to be incorporated on requirement in the specific proportion mentioned previously and subjecting the resulting mixture to a dynamic heat treatment.

The word "dynamic heat treatment" means that the polyethylene resin (a-1), the copolymer based on ethylene/α-olefin (a-2) and the resins and additives to be blended on requirement are kneaded in a molten (fused) state. The dynamic heat treatment can be performed using a kneading apparatus, such as a mixing roll, an intensive mixer (for instance, Bumbury's mixer or kneader), a single shaft extruder or a double shaft extruder, wherein preference is given to the use of double shaft extruder. The dynamic heat treatment may favorably be carried out in an non-open type kneading apparatus. It is also favorable to work under an inert gas, such as nitrogen.

On carrying out the dynamic heat treatment, it is favorable to settle a condition of a kneading temperature usually at 150-280° C., preferably 170-240° C., and a kneading duration usually of 1-20 minutes, preferably 1-5 minutes. The shearing force to be imposed upon the kneading may favorably be settled, in general, at $10$-$10^4$ sec$^{-1}$, preferably $10^2$-$10^4$ sec$^{-1}$, in terms of shearing velocity.

It is favorable for carrying out the dynamic heat treatment using a double shaft extruder that the condition of the following inequality (1), preferably inequality (1'), more preferably inequality (1"), is satisfied:

$$4.8 < [\{(T-130)/100\} + 2.2 \cdot \log P + \log Q - \log R] < 7.0 \quad (1)$$

$$5.0 < [\{(T-130)/100\} + 2.2 \cdot \log P + \log Q - \log R] < 6.8 \quad (1')$$

$$5.3 < [\{(T-130)/100\} + 2.2 \cdot \log P + \log Q - \log R] < 6.5 \quad (1'')$$

In the above inequalities (1), (1') and (1"), T denotes the resin temperature at the die exit of the double shaft extruder and P, Q and R represent each the screw diameter (mm), the maximum shearing velocity appeared (sec$^{-1}$) and the extrusion throughput (kg/hr) of the extruder, respectively. The maximum shearing velocity Q in sec$^{-1}$ can be determined by the equation $$Q = (P \times \pi \times S)/U$$

in which P is the screw diameter in mm, S denotes the revolution rate of the screw per second (rps) and U denotes the distance in mm of the clearance between the inside face of the barrel wall and the kneading segment of the screw at its narrowest portion.

The ethylenic thermoplastic elastomer (A) obtained by the dynamic heat treatment performed using a double shaft extruder in the absence of cross-linking agent under the condition satisfying the above inequality (1) is superior in the tensile strength, in the permanent elongation, in the compression set and in the molding appearance.

By the process for producing the ethylenic thermoplastic elastomer (A) according to the present invention, it is possible to produce the ethylenic thermoplastic elastomer (A) exhibiting superior rubbery elasticity in a simple and efficient manner by one single process step, by mixing the polyethylene resin (a-1) and the copolymer based on ethylene/α-olefin (a-2) or mixing the polyethylene resin (a-1), the copolymer based on ethylene/α-olefin (a-2) and the resins and additives blended on requirement in the above-mentioned specific proportion and subjecting the resulting mixture to the dynamic heat treatment, even when a cross-linking agent, such as an organic peroxide, and a cross-linking assistant, such as a divinyl compound used conventionally in the production of vulcanized rubber are not incorporated. No cross-linking agent nor cross-linking assistant is required and there is no necessity of bothersome vulcanization step, whereby the production can be effected at a low cost.

The substrate layer of the foamed laminate according to the present invention consists of a foamed body which can be obtained by causing to foam up a foamable ethylenic thermoplastic elastomer composition ($X_1$) comprising the ethylenic thermoplastic elastomer (A) and a foaming agent (B).

The Foaming Agent (B)

As the foaming agent (B), there may be recited, for example, organic and inorganic thermal decomposition type foaming agents; water; solvents, such as those based on hydrocarbon and halogenated hydrocarbon; and gases, such as nitrogen gas, carbon dioxide gas, propane and butane. As the foaming agent (B), organic and inorganic thermal decomposition type foaming agents, water, carbon dioxide and so on are preferred.

As the inorganic foaming agent of thermal decomposition type, there may be recited concretely, for example, sodium hydrogencarbonate, sodium carbonate, ammonium hydrogencarbonate, ammonium carbonate and ammonium nitrite.

As the organic foaming agent of thermal decomposition type, there may be recited concretely, for example, nitroso compounds, such as N,N'-dimethyl-N,N'-dinitroso-terephtharamide and N,N'-dinitrosopenta-methylenetetramine (DPT); azo compounds, such as azodicarbonamide (ADCA), azobisisobutyronitrile (AZBN), azobiscyclohexylnitrile, azodiaminobenzene and barium azodicarboxylate; sulfonylhydrazides, such as benzenesulfonylhydrazide (BSH), toluenesulfonylhydrazide (TSH), p,p'-oxybis(benzenesulfonylhydrazide) (OBSH) and diphenylsulfon-3,3'-disulfonylhydrazide; and azides, such as calcium azide, 4,4'-diphenyldisulfonyl azide and p-toluenesulfonyl azide.

The foaming agent (B) may be used individually or in a combination of two or more kinds.

The foaming agent (B) may favorably be used usually in an amount of 0.5-20 parts by weight, preferably 1-10 parts by weight, per 100 parts by weight of the ethylenic thermoplastic elastomer (A).

The foamable ethylenic thermoplastic elastomer composition ($X_1$) may, on requirement, contain by admixing thereto a foaming assistant. As the foaming assistant, there may be incorporated metal-containing compounds having a metal, such as zinc, calcium, lead, iron or barium; organic acids, such as citric acid, salicylic acid, phthalic acid, stearic acid and oxalic acid; and urea and its derivatives. The foaming assistant may favorably be used usually in an amount of 0.1-20 parts by weight, preferably 1-10 parts by weight, per 100 parts by weight of the ethylenic thermoplastic elastomer (A). The foaming assistant provides functions for, for example, lowering the decomposition temperature of the foaming agent, accelerating the decomposition and forming homogeneous foams.

The foamable ethylenic thermoplastic elastomer composition ($X_1$) may contain, if necessary, by admixing thereto, for example, an inorganic porous powdery substance, such as zeolite, a resin exhibiting higher adsorptivity for inorganic gases, such as polycarbonate resin, and nucleating agent for foaming.

The foamable ethylenic thermoplastic elastomer composition ($X_1$) may further contain, if necessary, by admixing thereto, various known additives, for example, filler, heat resisting stabilizer, antioxidant, weathering stabilizer, antistatic agent, wetting agent, lubricant, such as metal soap or wax, pigment, dyestuff, fire retarding agent and blocking inhibitor, within the range not obstructing the purpose of the present invention.

As the filler to be blended with the ethylenic thermoplastic elastomer composition ($X_1$), those which are incorporated usually in rubbers may favorably be used. Concretely, there may be recited, for example, calcium carbonate, calcium silicate, clay, kaolin, talc, silica, diatomaceous earth, powdery mica, asbestos, barium sulfate, aluminum sulfate, calcium sulfate, magnesium carbonate, molybdenum disulfide, glass fiber, glass beads, Shirasu balloon, graphite and alumina.

The filler may favorably be incorporated usually in an amount of 40 parts by weight or less, preferably 1-30 parts by weight, per 100 parts by weight of the ethylenic thermoplastic elastomer (A).

Preparation of the Foamable Ethylenic Thermoplastic Elastomer Composition ($X_1$)

The foamable ethylenic thermoplastic elastomer composition (X1) can be prepared by compounding the ethylenic thermoplastic elastomer (A), the foaming agent (B) and the optionally employed ingredients, such as foaming assistant and wetting agent.

For the practical way of compounding the ethylenic thermoplastic elastomer (A) and the foaming agent (B), there may be exemplified a method in which a pelletized product of the ethylenic thermoplastic elastomer (A) is once kneaded together with the foaming agent (B) on, for example, a tumbler type Bravender, a V-shaped Bravender, a ribbon blender or a Henschel mixer, followed by, if necessary, further kneading on an open type mixing roll or on a non-open type machine, such as Bumbury's mixer, extruder, kneader or continuous mixer.

The weathering stabilizer, heat-resisting stabilizer, antioxidant, pigment, dyestuff and so on may be admixed at any process step given above.

For obtaining a foamed body ($X_{F\ 1}$) of the above-mentioned foamable ethylenic thermoplastic elastomer composition ($X_1$), for example, a method of heating the ethylenic thermoplastic elastomer composition ($X_1$) may be employed.

For the raw material of the skin layer, at least one kind selected from the raw materials based on olefin given in the following 1) to 5) may favorably be employed according to the present invention:

1) The ultrahigh molecular weight polyolefin resin (Y) mentioned previously which is an ultrahigh molecular weight polyolefin resin having an intrinsic viscosity ($\eta$) of 3.5-8.3 dl/g, as determined in decalin of 135° C.
2) An olefinic thermoplastic elastomer composition (Z) containing, per 100 parts by weight of the olefinic thermoplastic elastomer (C), at least one lubricant ($Z_L$) selected from the group consisting of 0.5-25 parts by weight of an organopolysiloxane (D), 0.5-10 parts by weight of a fluorine-containing polymer (E), 0.5-10 parts by weight of an antistatic agent (F), 5-200 parts by weight of a polyolefin resin (G), 0.01-5 parts by weight of a fatty acid amide, 0.5-10 parts by weight of a mineral oil, 0.01-5 parts by weight of a metal soap, 0.01-5 parts by weight of an ester, 0.01-5 parts by weight of calcium carbonate and 0.01-5 parts by weight of a silicate, each in the given proportion.
3) An olefinic thermoplastic elastomer composition ($Z_1$) containing, per 100 parts by weight of the olefinic thermoplastic elastomer (C), at least one selected from the group consisting of 0.5-25 parts by weight of an organopolysiloxane (D), 0.5-10 parts by weight of a fluorine-containing polymer (E) and 0.5-10 parts by weight of an antistatic agent (F), each in the given proportion.
4) An olefinic thermoplastic elastomer composition ($Z_2$) containing a polyolefin resin (G) in an amount of 5-200 parts by weight, per 100 parts by weight of the olefinic thermoplastic elastomer (C).
5) An olefinic thermoplastic elastomer composition ($Z_3$) containing, per 100 parts by weight of the olefinic thermoplastic elastomer (C), at least one selected from the group consisting of 0.5-25 parts by weight of an organopolysiloxane (D), 0.5-10 parts by weight of a fluorine-containing polymer (E), 0.5-10 parts by weight of an antistatic agent (F), 0.01-5 parts by weight of a fatty acid amide, 0.5-10 parts by weight of a mineral oil, 0.01-5 parts by weight of a metal soap, 0.01-5 parts by weight of an ester, 0.01-5 parts by weight of calcium carbonate and 0.01-5 parts by weight of a silicate, each in the given proportion, and further a polyolefin resin (G) in an amount of 5-200 parts by weight.

The Ultrahigh Molecular Weight Polyolefin Resin (Y)

The ultrahigh molecular weight polyolefin resin (Y) to be used as the raw material of the skin layer according to the present invention is an ultrahigh molecular weight polyolefin resin having an intrinsic viscosity ($\eta$) in the range from 3.5 to 8.3 dl/g, preferably from 3.8 to 8.0 dl/g, as determined in decalin of 135° C. The ultrahigh molecular weight polyolefin resin (Y) may either consist of a single kind of resin or a composition comprising two or more resins. For the case of the resin composition, one which has an intrinsic viscosity ($\eta$) as the entire composition within the above-mentioned range may be employed.

In the case where the ultrahigh molecular weight polyolefin resin (Y) is a resin composition, an ultrahigh molecular weight polyolefin resin composition comprising an ultrahigh molecular weight polyolefin resin (y-1) having an intrinsic viscosity ($\eta$) of 10-40 dl/g, as determined in decalin of 135°

C., and a polyolefin resin (y-2) having an intrinsic viscosity (η) of 0.1-5 dl/g, as determined in decalin of 135° C., is favorable and, further, such an ultrahigh molecular weight polyolefin resin composition may be more favorable, which contains 15-40 parts by weight of the ultrahigh molecular weight polyolefin resin (y-1) and 60-85 parts by weight of the polyolefin resin (y-2), and particularly favorable one contains 18-35 parts by weight of the ultrahigh molecular weight polyolefin resin (y-1) and 65-82 parts by weight of the polyolefin resin (y-2), with the total of the two summing up to 100 parts by weight.

As the ultrahigh molecular weight polyolefin resin (y-1) and the polyolefin resin (y-2), there may be recited, for example, homopolymers and copolymers of α-olefins, such as ethylene, propylene, 1-butene, 1-pentene, 1-hexene, 1-octene, 1-decene, 1-dodecene, 4-methyl-1-pentene and 3-methyl-1-pentene. For the ultrahigh molecular weight polyolefin resin (y-1) and for the polyolefin resin (y-2), copolymers composed mainly of ethylene, namely, homopolymers of ethylene and copolymers of ethylene with other α-olefin, are preferred.

The ultrahigh molecular weight polyolefin resin (Y) may contain a liquid or solid softening agent (lubricating oil).

As the liquid softening agent to be admixed to the ultrahigh molecular weight polyolefin resin (Y), those based on mineral oil and synthetic ones are used. Concretely, there may be enumerated, for example, paraffinic and naphthenic lubricant oils, liquid paraffin, spindle oil, refrigerator oil, dynamo oil, turbine oil, machine oil and cylinder oil. As the synthetic lubricant oils, there may be recited concretely synthetic hydrocarbon oils, polyglycol oils, polyphenyl ether oils, ester oils, phosphate oils, polychlorotrifluoroethylene oils, fluoroester oils, chlorinated biphenyl oils and silicone oils.

As the solid softening agent, concretely, graphite and molybdenum disulfide are used principally, though otherwise boron nitride, wolfram disulfide, lead oxide, glass powder, metal soaps and so on may also be used.

The softening agent may be incorporated either individually or in a combination of two or more kinds in a form of, for example, powder, sol, gel or suspensoid.

The content of the softening agent may favorably be in the range from 1 to 20 parts by weight, preferably from 3 to 15 parts by weight, per 100 parts by weight of the ultrahigh molecular weight polyolefin resin (Y).

There may be compounded with the ultrahigh molecular weight polyolefin resin (Y), if necessary, additives, such as heat-resisting stabilizer, antistatic agent, weathering stabilizer, antioxidant, filler, coloring agent and lubricant, within the range not obstructing the purpose of the present invention.

According to the present inventions, it is possible to use as the skin layer the above-mentioned olefinic thermoplastic elastomer composition (Z), wherein it is preferable to use, as the olefinic thermoplastic elastomer composition (Z), the olefinic thermoplastic elastomer compositions ($Z_1$) to ($Z_3$) given above.

The Olefinic Thermoplastic Elastomer Compositions ($Z_1$) to ($Z_3$)

The Olefinic Thermoplastic Elastomer (C)

According to the present invention, there may be incorporated, for the olefinic thermoplastic elastomer (C) to be used as the raw material of the skin layer, for example, an olefinic thermoplastic elastomer composed of a crystalline polyolefin resin (c-1) and a rubber (c-2).

As the crystalline polyolefin resin (c-1), there may be enumerated, for example, homopolymers and copolymers of α-olefins having 2-20 carbon atoms. Concrete examples of the crystalline polyolefin (c-1) include those given below:
1) Homopolymers of ethylene (obtained either by low pressure and high pressure processes)
2) Copolymers of ethylene with 10 mole % or less, preferably less than 10 mole %, of other α-olefin or vinyl monomer, such as vinyl acetate or ethyl acrylate
3) Homopolymers of propylene
4) Random copolymers of propylene with 10 mole % or less, preferably less than 10 mole %, of other α-olefins
5) Block-copolymers of propylene with 30 mole % or less of other α-olefins
6) Homopolymers of 1-butene
7) Random copolymers of 1-butene with 10 mole % or less, preferably less than 10 mole %, of other α-olefins
8) Homopolymers of 4-methyl-1-pentene
9) Random copolymers of 4-methyl-1-pentene with 20 mole % or less, preferably less than 20 mole %, of other α-olefins As the above α-olefins, there may concretely be exemplified ethylene, propylene, 1-butene, 4-methyl-1-pentene, 1-hexene and 1-octene.

As the crystalline polyolefin resin (c-1), there may favorably be enumerated homopolymers of propylene and copolymers of propylene used as principal component with another olefin, for example, propylene/ethylene copolymer, propylene/1-butene copolymer, propylene/1-hexene copolymer and propylene/4-methyl-1-pentene copolymer.

The crystalline polyolefin resin (c-1) may favorably have an MFR (ASTM D-1238, 230° C., 2.16 kg load) in the range from 0.01 to 100 g/10 min., preferably from 0.1 to 50 g/10 min.

There is no special limitation as to the rubber (c-2) to be used according to the present invention, though preference is given to olefinic copolymer rubbers.

For the olefinic copolymer rubber to be used as the rubber (c-2), there may be exemplified amorphous random elastomeric copolymers each having, as a main component, an α-olefin having 2-20 carbon atoms, such as non-crystalline α-olefin copolymers each constituted of at least two α-olefins and α-olefin/non-conjugated polyene copolymers each constituted of at least two α-olefins and non-conjugated diene(s).

As concrete examples of the olefinic copolymer rubbers to be used as the rubber (c-2), the rubbers, such as those given above may be recited:
1) Copolymer rubbers of ethylene/α-olefin having ethylene/α-olefin mole ratios of 90/10 to 50/50
2) Copolymer rubbers of ethylene/α-olefin/non-conjugated diene having ethylene/α-olefin mole ratios of 90/10 to 50/50
3) Copolymer rubbers of propylene/α-olefin having the mole ratio propylene/α-olefin of 90/10 to 50/50
4) Copolymer rubbers of butene/α-olefin having butene/α-olefin mole ratios of 90/10 to 50/50

As the α-olefin, there may concretely be exemplified those which are the same as the concretely exemplified α-olefins constituting the crystalline polyolefin (c-1) given above.

As the non-conjugated polyene, there may concretely be exemplified non-conjugated dienes, such as dicyclopentadiene, 1,4-hexadiene, cyclooctadiene, methylenenorbornene and ethylidenenorbornene.

The rubber (c-2) may be used either individually or in a combination of two or more kinds.

As the rubber (c-2), concretely, there may favorably be used ethylene/propylene copolymer rubbers, ethylene/propylene/non-conjugated polyene copolymer rubbers, ethylene/1-butene copolymer rubbers and ethylene/1-butene/non-conjugated polyene rubbers, with special preference to ethylene/propylene/non-conjugated polyene copolymer rubbers, in particular, ethylene/propylene/ethylidene-norbornene copolymer rubber and ethylene/propylene/cyclopentadiene copolymer rubber.

These copolymer rubbers may favorably have Mooney viscosities $ML_{1+4}$ (100° C.) in the range from 10 to 250, preferably from 40 to 150. For the case where the above non-conjugated polyene is co-polymerized, they may favorably have iodine values of 25 or lower.

For the rubber (c-2) to be used according to the present invention, there may also be recited other rubbers, for example, rubbers based on diene, such as styrene/butadiene rubber (SBR), nitrile rubbers (NBR), natural rubber (NR) and butyl rubber (IIR), and SEBS as well as polyisobutylenes.

In the olefinic thermoplastic elastomer (C) to be used according to the present invention, the weight proportion of the crystalline polyolefin resin (c-1) to the rubber (c-2), namely, [crystalline polyolefin resin]/[rubber], may favorably be in the range of usually from 90/10 to 5/95, preferably from 70/30 to 10/90.

In the case of using, as the rubber (c-2), the olefinic copolymer rubber in combination with other rubber, it is favorable to incorporate the said other rubber in an amount of 40 parts by weight or less, preferably in the range from 5 to 20 parts by weight, per 100 parts by weight of the total sum of the crystalline polyolefin resin (c-1) and the rubber (c-2).

If necessary, the olefinic thermoplastic elastomer (C) may be compounded with additives, such as softening agent, heat-resisting stabilizer, weathering stabilizer, antioxidant, filler and coloring agent, within the range not obstructing the purpose of the present invention.

As the softening agent, those used usually for rubbers may be employed, wherein preference is given to those based on mineral oil and to synthetic ones.

As the softening agent based on mineral oil to be compounded with the olefinic thermoplastic elastomer (C), for example, lubricating oils based on petroleum, such as paraffinic, naphthenic and aromatic ones, and liquid paraffin are recited. As the synthetic softening agent, there may be recited, for example, polyethylene wax, polypropylene wax, petroleum asphalt and vaseline.

For other softening agents, there may be recited, for example, coal tars, such as coal tar and coal tar pitch; fatty oils, such as castor oil, linseed oil, rape oil, soybean oil and coconut oil; waxes, such as tall oil, beeswax, carnauba wax and lanoline; fatty acids, such as ricinoleic acid, palmitic acid, stearic acid, 12-hydroxystearic acid, montanic acid, oleic acid and erucic acid, as well as their metal salts; synthetic polymer products, such as petroleum resin, cumarone-indene resin and atactic polypropylene; plasticizers based on ester, such as dioctyl phthalate, dioctyl adipate and dioctyl sebacate; others including microcrystalline wax, liquid polybutadiene and modified and hydrogenated products thereof, and liquid Thiokol.

These softening agents may favorably be used in a proportion of 5-200 parts by weight, preferably 15-150 parts by weight, more preferably 20-80 parts by weight, per 100 parts by weight of the olefinic thermoplastic elastomer (C).

The softening agent may be added to the olefinic thermoplastic elastomer (C) during the production thereof or may have been admixed beforehand to the rubber (c-2) in a form of an extender oil.

The olefinic thermoplastic elastomer (C) to be used according to the present invention can be obtained by subjecting a mixture of the crystalline polyolefin resin (c-1) and the rubber (c-2), with occasionally incorporated softening agent etc., to the dynamic heat treatment.

The rubber (c-2) may be present in the olefinic thermoplastic elastomer (C) in non-cross-linked state or in every cross-linked state from a partially cross-linked state to the fully cross-linked state.

For producing the olefinic thermoplastic elastomer (C) in such a cross-linked state, it is favorable to subject a mixture of the crystalline polyolefin resin (c-1) and the rubber (c-2) with-the optionally added ingredients, such as the softening agent etc., to a dynamic heat treatment in the presence of a cross linking agent.

For the cross linking agent which can be used upon the dynamic heat treatment; those which are used usually in thermosetting type rubbers may be employed for example, organic peroxides, sulfur, phenol resins, amino resins, quinones and derivatives thereof, compounds based on amine, epoxy compounds and isocyanates. Among them, organic peroxides are especially preferable.

As the organic peroxide, there may concretely be enumerated, for example, dicumyl peroxide, di-tert-butyl peroxide, 2,5-dimethyl-2,5-di-(tert-butylperoxy)-hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxy benzoate, tert-butyl perbenzoate, tert-butylperoxyisopropyl carbonate, diacetyl peroxide, lauroyl peroxide and tert-butylcumyl peroxide.

Among them, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis-(tert-butylperoxy)-3,3,5-trimethylcyclohexane and n-butyl-4,4-bis(tert-butylperoxy) valerate are preferred in view of odour and scorching stability and, in particular, 1,3-bis(tert-butylperoxyisopropyl)benzene is at the most preferable.

According to the present invention, the organic peroxide is used in a proportion of 0.05-3 parts by weight, preferably 0.1-1 part by weight, per 100 parts by weight of the total sum of the crystalline polyolefin resin (c-1) and the rubber (c-2).

On the cross-linking treatment using the organic peroxide, it is possible to add an assistant for the peroxide cross-linking, such as sulfur, p-quinone dioxime, p,p'-dibenzoylquinonedioxime, N-methyl-N-4-dinitrosoaniline, nitrosobenzene, diphenylguanidine and trimethylolpropane-N,N'-m-phenylenedimaleimide, or to add polyfunctional methacrylate monomers, such as divinylbenzene, triallyl cyanurate, ethylene glycol dimethacrylate, diethylene glycol dimethacrylate, polyethyleneglycol dimethacrylate, trimethylolpropane trimethacrylate and allyl methacrylate, or poly-functional vinyl monomers, such as vinyl butyrate and vinyl stearate.

By incorporating the compounds as above, a uniform and mild cross-linking reaction can be expected. In particular, divinylbenzene is at the most preferable according to the present invention. Divinylbenzene is easy to handle, exhibits better compatibility with the principal components, namely, the crystalline polyolefin resin (c-1) and the rubber (c-2) and has a function of solubilizing organic peroxide so as to act as a dispersant for the organic peroxide, so that it provides a uniform cross-linking effect by the heat treatment, whereby an olefinic thermoplastic elastomer (C) exhibiting better balance between the flowability and the material properties can be obtained.

The above-mentioned cross linking assistant or the polyfunctional vinyl monomer may favorably be used in a proportion of 0.1-3% by weight, preferably 0.3-2% by weight, based on the entire mass to be subjected to the cross linking. When the proportion of the cross linking assistant or the polyfunctional vinyl monomer to be added is in the range given above, the resulting thermoplastic elastomer will be devoid of any residue of unreacted monomer of such cross linking assistant or polyfunctional vinyl monomer, so that no change in the material properties due to the thermal hysteresis occurs upon the process step of molding and superior flowability is attained.

The word "dynamic heat treatment" means that the components given above are kneaded in a molten (fused) state.

As the kneading apparatus, known ones, such as for example, open-type mixing roll and non-open type ones, such as Bumbury's mixer, extruder, kneader and continuous mixer, may be employed. Among them, non-open type kneading apparatuses are preferred, wherein the kneading procedure may favorably be effected under an inert gas atmosphere, such as nitrogen gas or carbon dioxide gas.

The temperature upon the dynamic heat treatment may usually be at 150-280° C., preferably 170-240° C., and the kneading duration may favorably be 1-20 minutes, preferably 3-10 minutes. The shearing force imposed may favorably be 100 $\sec^{-1}$ or greater, preferably 500-10,000 $\sec^{-1}$, in terms of shearing velocity.

The olefinic thermoplastic elastomer (C) to be used favorably according to the present invention may favorably have a gel content, as calculated according to the procedures given below, of 10% by weight or higher, preferably 20% by weight or higher, especially preferably 45% by weight or higher.

(Method for Determining the Gel Content)

About 100 mg of a sample of the thermoplastic elastomer are weighed off and cut into grains of a size of 0.5 mm×0.5 mm×0.5 mm and the resulting grains are soaked in 30 ml of cyclohexane in a tightly sealed vessel at 23° C. for 48 hours. The so-soaked granular sample is taken out on a filter paper and is dried at room temperature for over 72 hours until a constant weight is reached.

The value calculated by subtracting the weight of cyclohexane-insoluble ingredients other than the polymer components (for example, fibrous filler, filler and pigments) from the weight of the above dried residual matter is regarded as the "corrected final weight of (Y)".

On the other hand, the value calculated by subtracting the weight of cyclohexane-soluble ingredients other than the polymer components (for example, softening agent) and the weight of cyclohexane-insoluble ingredients other than the polymer components (for example, fibrous filler, filler and pigments) from the weight of the above dried residual matter is regarded as the "corrected initial weight of (X)".

The gel content (content of cyclohexane-insoluble polymer) is calculated by the equation:

$$\text{Gel cont. (wt. \%)} = \frac{[\text{corrected final wt. } (Y)]}{[\text{corrected init. wt. } (X)]} \times 100$$

As the olefinic thermoplastic elastomer (C) to be used for the skin layer according to the present invention, the above-mentioned ethylenic thermoplastic elastomer (A) can also be employed.

The olefinic thermoplastic elastomer (C) constituting the skin layer of the foamed laminate based on olefin according to the present invention is constituted of the crystalline polyolefin resin (c-1) and the rubber (c-2) and, therefore, is superior in the flowability.

Such a polyolefinic thermoplastic elastomer (C) can be formed on conventionally employed molding apparatuses by, for example, compression molding, transfer molding, injection molding and extrusion molding.

The Organopolysiloxane (D)

As the organopolysiloxane (D) to be used for the lubricant ($Z_L$), known organopolysiloxanes having —Si—O— bonds in the main chain may be used without any restriction. By incorporating organopolysiloxane (D), a skin layer exhibiting superior sliding performance and superior abrasion resistance can be obtained.

As the organopolysiloxane (D), there may be recited concretely, for example, dimethylpolysiloxane, methylphenylpolysiloxane, fluoropolysiloxane, tetramethyl-tetraphenylpolysiloxane and methylhydrogenpolysiloxane, as well as modified polysiloxanes, such as epoxy-modified, alkyl-modified, amine-modified, carboxyl-modified, alcohol-modified, fluorine-modified, alkyl-aralkylpolyether-modified and epoxypolyether-modified ones. Among them, preference is given to dimethylpolysiloxane. The organopolysiloxane (D) can be used either individually or in a combination of two or more kinds.

For the organopolysiloxane (D), those which have viscosity values (as determined according to JIS K 2283 at 25° C.) in the range from 10 to $10^7$ cSt are preferred. Among them, those having viscosity values (JIS K 2283 at 25° C.) of $10^6$ or higher may be formulated as a masterbatch with olefinic resin(s) for enhancing the dispersibility in the olefinic thermoplastic elastomer (C), as they have a very high viscosity. As the olefinic resin to be used here, the crystalline polyolefin resin (c-1) used for preparing the olefinic thermoplastic elastomer (C) is recited and, concretely, there may be recited, for example, homopolymers of ethylene, copolymers of ethylene with other α-olefins, homopolymers of propylene and copolymers of propylene with other α-olefins.

The organopolysiloxane (D) may be incorporated either individually or in a combination of two or more kinds in accordance with the viscosity thereof. In particular, in the case of using two or more kinds in combination, it is preferable to use a combination of a lower viscosity organopolysiloxane (D) having a viscosity of $10$-$10^6$ cSt with a higher viscosity organopolysiloxane (D) having a viscosity of $10^6$-$10^7$ cSt.

In the olefinic thermoplastic elastomer composition ($Z_1$), the organopolysiloxane (D) may be contained in a proportion of 0.5-20 parts by weight, preferably 1-18 parts by weight, per 100 parts by weight of the olefinic thermoplastic elastomer (C). If the content of the organopolysiloxane (D) is in the above range, the resulting foamed laminate is superior in the sliding performance and there occurs no inconvenience due to, for example, sticky hand touch of the surface by the organopolysiloxane (D).

The Fluorine-Containing Polymer (E)

As the fluorine-containing polymer (E) to be used as the lubricant ($Z_L$), known polymers having fluorine atom may be employed without any restriction. By addition of the fluorine-containing polymer (E), the skin layer becomes superior in the sliding performance and in the abrasion resistance.

As the fluorine-containing polymer (E) to be used according to the present invention, there may be enumerated, for example, polytetrafluoroethylene, tetrafluoroethylene/hexafluoropropylene copolymer, tetrafluoroethylene/perfluorovinyl ether copolymer, tetrafluoroethylene/ethylene copolymer, polymers of vinylidene fluoride and polymers of vinyl fluoride. The fluorine-containing polymer (E) may be incorporated either individually or in a combination of two or more kinds.

The fluorine-containing polymer (E) may be formulated preliminarily as a masterbatch with olefinic resin(s) and/or with known inorganic filler(s), in order to facilitate the dispersibility in the olefinic thermoplastic elastomer (C) or to further increase the effect of improving the sliding performance. As the olefinic resin to be used here, those which are the same as used in the masterbatch for the organosiloxane (D) may be enumerated. As the inorganic filler, there may be recited, for example, calcium carbonate, titanium oxide, talc and clay.

In the olefinic thermoplastic elastomer composition ($Z_1$), the fluorine-containing polymer (E) may be contained in a proportion of 0.5-10 parts by weight, preferably 1-8 parts by weight, per 100 parts by weight of the olefinic thermoplastic elastomer (C). When the content of the fluorine-containing polymer (E) is in the above range, the resulting foamed laminate is superior in the sliding performance.

The Antistatic Agent (F)

For the antistatic agent (F) to be used as the lubricant ($Z_1$), known antistatic agents used in general for resins may be employed without any restriction, examples of which include anionic surfactants, cationic surfactants, non-ionic surfactants and ampholytic surfactants. By incorporating the antistatic agent (F), the resulting skin layer becomes superior in the sliding performance and in the abrasion resistance.

Concrete examples of the antistatic agent (F) include lauryldiethanolamine, N,N-bis(2-hydroxyethyl)-stearylamine, stearyl monoglyceride, distearyl glyceride, tristearyl glyceride, polyoxyethylene-laurylamine capryl ester and stearyldiethanolamine monostearate. The antistatic agent (F) may be used either individually or in a combination of two or more kinds.

The antistatic agent (F) may be formulated preliminarily as a masterbatch with olefinic resin(s) and/or with known inorganic filler(s), in order to facilitate the dispersibility in the olefinic thermoplastic elastomer (C) or to further increase the effect of improving the sliding abrasion resistance. As the olefinic resin and the inorganic filler to be used here, those which are the same as those mentioned above may be enumerated.

In the olefinic thermoplastic elastomer composition ($Z_1$), the antistatic agent (F) may be contained in a proportion of 0.5-10 parts by weight, preferably 1-8 parts by weight, per 100 parts by weight of the olefinic thermoplastic elastomer (C). When the content of the antistatic agent (F) is in the above range, the resulting foamed laminate is superior in the sliding performance and there occurs no inconvenience due to, for example, whitening by deposition of the antistatic agent on the surface (bleeding out).

In the olefinic thermoplastic elastomer composition ($Z_1$), the organopolysiloxane (D), the fluorine-containing polymer (E) and the antistatic agent (F) may each be used either individually or in a combination of two or more kinds, wherein the combination is arbitrary.

The Polyolefin Resin (G)

As the polyolefin resin (G) to be used for the lubricant ($Z_L$), the crystalline polyolefin resin (c-1) used for the olefinic thermoplastic elastomer (C) may favorably be employed. Also, the ultrahigh molecular weight polyolefin resin (Y) described previously may be employed for the polyolefin resin (G) to be used according to the present invention.

In the olefinic thermoplastic elastomer composition ($Z_2$), the polyolefin resin (G) may be contained in a proportion of 5-200 parts by weight, preferably 10-180 parts by weight, per 100 parts by weight of the olefinic thermoplastic elastomer (C). When the olefinic thermoplastic elastomer (C) and the polyolefin resin (G) are used in such a proportion, the skin layer obtained exhibits better moldability and better molding appearance and is superior in the sliding performance and in the abrasion resistance.

Concrete examples of the fatty acid amide to be used as the lubricant ($Z_L$) include those of a type of monoamide of higher fatty acid, such as stearoamide, oxystearoamide, oleylamide, erucylamide, laurylamide, palmitylamide and behenylamide; those of a type of amide of higher fatty acid, such as methylolamide, methylenebisstearoamide, ethylenebisstearoamide, ethylenebisoleylamide and ethylenebislaurylamide; those of a composite type amide, such as stearyloleylamide, N-stearylerucamide and N-oleylpalmitamide; and special fatty acid amides, such as those marketed from Fujisawa Pharmaceutical Co., Ltd. under the trade names Plastorosin and Plastorosin S. They may be used each individually or in a combination of two or more of them. The fatty acid amide may favorably be employed in a proportion of 0.01-5 parts by weight, preferably 0.05-3 parts by weight, per 100 parts by weight of the olefinic thermoplastic elastomer (C). When this is in the above range, sliding performance, wear-resistance and moldability become superior.

The esters to be used as the lubricant ($Z_L$) consist of those made of fatty alcohols with dicarboxylic acids or fatty acids. For such esters, there may concretely be enumerated, for example, esters of cetyl alcohol with acetic acid, cetyl alcohol with propionic acid, cetyl alcohol with butyric acid, tallow alcohol with acetic acid, tallow alcohol with propionic acid, tallow alcohol with butyric acid, stearyl alcohol with acetic acid, stearyl alcohol with propionic acid, stearyl alcohol with butyric acid and distearyl alcohol with phthalic acid; glycerin monooleate, glycerin monostearate, 12-hydroxystearate, glycerin tristearate, trimethylolpropane tristearate, pentaerythritol tetrastearate, butyl stearate, isobutyl stearate, esters of stearic acid, esters of oleic acid, esters of behenic acid, esters containing calcium soap, isotridecyl stearate, cetyl palmitate, cetyl stearate, stearyl stearate, behenyl behenate, montanic acid ethylene glycol esters, montanic acid glycerin esters, montanic acid pentaerythritol esters and calcium-containing montanic acid esters. Among them, ester of distearyl alcohol with phthalic acid, glycerin monooleate, glycerin monostearate, stearic acid eaters and montanic acid glycerin esters are preferred, wherein special preference is given to esters of distearyl alcohol with phthalic acid, glycerin monostearate and montanic acid glycerin esters. These esters may favorably be incorporated in a proportion of 0.01-5 parts by weight, preferably 0.05-3 parts by weight, per 100 parts by weight of the olefinic thermoplastic elastomer (C). When they are in this range, sliding performance, abrasion resistance and moldability become superior.

As the silicate mentioned previously to be used as the lubricant ($Z_L$), those represented by the formula

$$M_2O.mSiO_2.nH_2O$$

may be exemplified, in which M denotes an alkali metal and m and n represent each the number of moles of $SiO_2$ and of $H_2O$ per one mole of $M_2O$, wherein concrete examples include sodium silicate, potassium silicate and lithium silicate. Such silicate may favorably be incorporated in a proportion of 0.01-5 parts by weight, preferably 0.05-3 parts by weight, per 100 parts by weight of the olefinic thermoplastic elastomer (C). When it is in this range, sliding performance, abrasion resistance and moldability become superior.

The polyolefin resin (G) can be incorporated concurrently with at least one selected from the group consisting of the organopolysiloxane (D), the fluorine-containing polymer (E), the antistatic agent (F), the fatty acid amide, the mineral oil, the metal soap, the ester, calcium carbonate and the silicate. Among them, a concurrent use of the polyolefin resin (G) with at least one selected from the group consisting of the organopolysiloxane (D), fluorine-containing polymer (E) and the antistatic agent (F) is preferable. The amount of each component to be contained in the olefinic thermoplastic elastomer composition ($Z_3$) is as given above.

There may be compounded with the olefinic thermoplastic elastomer composition (Z) and with the olefinic thermoplastic elastomer compositions ($Z_1$) to ($Z_3$), on requirement, additives, such as softening agent based on mineral oil, heat resisting stabilizer, weathering stabilizer, antioxidant, filler and coloring agent, within the range not obstructing the purpose of the present invention.

The olefinic thermoplastic elastomer composition (Z) and the olefinic thermoplastic elastomer compositions ($Z_1$)-($Z_3$) can be produced by known techniques, for example, by kneading the olefinic thermoplastic elastomer (C) with at least one selected from the group consisting of the organopolysiloxane (D), the fluorine-containing polymer (E) and the antistatic agent (F), as well as with the polyolefin resin (G) and other optionally admixed additives.

According to the present invention, it is also permissible to use, as the substrate layer, a foamed body ($X_{F\,2}$) of an olefinic thermoplastic elastomer composition ($X_2$) comprising 100 parts by weight of an olefinic thermoplastic elastomer (J) and 1-20 parts by weight of an olefinic thermoplastic resin (K), in the place of the foamed body ($X_{F\,1}$) described previously.

The Olefinic Thermoplastic Elastomer (J)

The olefinic thermoplastic elastomer (J) to be used as the raw material of the substrate layer according to the present invention is an olefinic thermoplastic elastomer obtained by dynamically heat-treating a mixture comprising 5-60 parts by weight, preferably 10-50 parts by weight, of a polyolefin resin (j-1) and 40-95 parts by weight, preferably 50-90 parts by weight, of an ethylene/α-olefin copolymer rubber (j-2), with the total of the components (j-1) and (j-2) summing up to 100 parts by weight. The olefinic thermoplastic elastomer (J) may contain, in addition to the components (j-1) and (j-2), further, if necessary, other component(s), such as a softening agent (j-3) and so on.

The olefinic thermoplastic elastomer (J) to be used according to the present invention may favorably be an olefinic thermoplastic elastomer obtained by subjecting a mixture comprising the polyolefin resin (j-1) and the ethylene/α-olefin copolymer rubber j-2) in the above-mentioned proportion and, further, if necessary, a softening agent (j-3) and so on, to a dynamic heat treatment in the presence of a cross-linking agent. The olefinic thermoplastic elastomer (J) may favorably be one which has a compression set of 60% or lower, preferably 15-55%, as determined according to JIS K 6262 (70° C., 22 hours), and a melt flow rate of 0.1 g/10 min. or higher, preferably 1-300 g/10 min., as determined according to JIS K 7120 (230° C., 10 kg load). When the contents of the polyolefin resin (j-1) and of the ethylene/α-olefin copolymer rubber (j-2) are in the above-mentioned ranges, respectively, a foamed body ($X_{F\,2}$) superior in the flexibility and an olefinic thermoplastic elastomer composition ($X_2$) superior in the flowability can be obtained.

The polyolefin resin (j-1) is a resin constituted of a crystalline high molecular weight solid product obtained by polymerizing one or two or more monoolefins by a high pressure process or a low pressure process. For such a resin, there may be recited, for example, monoolefinic polymer or copolymer resins of isotactic and syndiotactic natures. Typical products of these resins are available in the market.

As suitable starting olefins of the polyolefin resin (j-1), there may concretely be enumerated, for example, α-olefins having 2-20 carbon atoms, such as ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene. These olefins may be employed each individually or in a combination of two or more of them.

As the polyolefin resin (j-1), homopolymers of propylene and copolymers composed mainly of propylene with other olefins are preferable. As the copolymers, concretely, for example, propylene/ethylene copolymer, propylene/1-butene copolymer, propylene/1-hexene copolymer and propylene/4-methyl-1-pentene copolymer are preferred.

The polyolefin resin (j-1) may favorably have a melt flow rate (MFR: ASTM D-1238-65T, 230° C., 2.16 kg load) usually in the range from 0.01 to 100 g/10 min., preferably from 0.05 to 50 g/10 min.

The polyolefin resin (j-1) has a function of improving the flowability of the resin composition and increasing the heat resistance.

The polyolefin resin (j-1) may be used either individually or in a combination of two or more kinds.

The ethylene/α-olefin copolymer rubber (j-2) to be used according to the present invention is an ethylene/α-olefin copolymer rubber and/or an ethylene/α-olefin/non-conjugated polyene copolymer rubber and is an elastomeric copolymer having amorphous and random structure.

Concrete examples of the α-olefin include those having 3-20 carbon atoms, such as propylene, 1-butene, 1-pentene, 1-hexene, 1-octene, 1-decene, 2-methyl-1-propene, 3-methyl-1-pentene, 4-methyl-1-pentene and 5-methyl-1-hexene. These olefins may be used each individually or in a mixture of two or more of them.

As the non-conjugated polyene, there may be enumerated concretely, for example, dicyclopentadiene, 1,4-hexadiene, cyclooctadiene, methylenenorbornene, ethylidenenorbornene and vinylnorbornene.

As the ethylene/α-olefin copolymer rubber (j-2), for example, an ethylene/propylene copolymer rubber, an ethylene/propylene/non-conjugated polyene copolymer rubber, an ethylene/1-butene copolymer rubber and an ethylene/1-butene/non-conjugated polyene copolymer rubber are preferred. Especially preferable ones are ethylene/propylene/non-conjugated polyene copolymer rubbers, in particular, ethylene/propylene/ethylidenenorbornene copolymer rubber and ethylene/propylene/dicyclopentadiene copolymer rubber, which are preferable especially in the point of view of that an olefinic thermoplastic elastomer (J) having a proper cross-linked structure can be obtained.

The ethylene/α-olefin copolymer rubber (j-2) to be used according to the present invention may favorably have an ethylene content in the range from 55 to 95 mole %, preferably from 60 to 90 mole %.

The ethylene/α-olefin copolymer rubber (j-2) may favorably have a Mooney viscosity [$ML_{1+4}$ (100° C.)] in the range from 10 to 250, preferably from 30 to 160.

The ethylene/α-olefin copolymer rubber (j-2) may favorably have an iodine value of 25 or lower, preferably in the range from 5 to 25. When the iodine value of the ethylene/α-olefin copolymer rubber (j-2) is 25 or lower, an olefinic thermoplastic elastomer (J) having a proper cross-linked structure is obtained.

The ethylene/α-olefin copolymer rubber (j-2) may be incorporated either individually or in a combination of two or more kinds.

According to the present invention, it is also possible to incorporate the ethylene/α-olefin copolymer rubber (j-2) in combination with other rubber(s) other than the ethylene/α-olefin copolymer rubber (j-2), within the range not obstructing the purpose of the present invention.

As the rubbers other than the ethylene/α-olefin copolymer rubber (j-2), there may be recited, for example, a propylene/α-olefin copolymer rubber (with a propylene/α-olefin mole ratio in the range from 90/10 to 50/50), a butene/α-olefin copolymer rubber (with a butene/α-olefin mole ratio in the range from 90/10 to 50/50), butyl rubber, polyisobutylene rubber, styrene/butadiene rubber (SBR) and its hydrogenation product (H-SBR), styrene/butadiene block-copolymer rubber (SBS) and its hydrogenation product (SEBS), styrene/isoprene block-copolymer rubber (SIS) and its hydrogenation product (SEPS, HV-SIS), nitrile rubber (NBR), natural rubber (NR) and silicone rubber.

When these rubbers other than the ethylene/α-olefin copolymer rubber (j-2) are employed in a combination with the ethylene/α-olefin copolymer rubber (j-2), the rubber other than the ethylene/α-olefin copolymer rubber (j-2) may favorably be incorporated in a proportion of 5-100 parts by weight, preferably 5-40 parts by weight, per 100 parts by weight of the total sum of the ethylene/α-olefin copolymer rubber (j-2) and the polyolefin resin (j-1).

The olefinic thermoplastic elastomer (J) may be compounded with the softening agent (j-3). As the softening agent (j-3), those which are used usually in rubbers may be employed, while preference is given in particular to those based on mineral oil and synthetic ones.

For the softening agent based on mineral oil, there may be recited, for example, lubricating oils based on petroleum, such as paraffinic, naphthenic and aromatic ones, and liquid paraffin. For the synthetic softening agent, there may be recited, for example, polyethylene wax, polypropylene wax, petroleum asphalt and vaseline.

For other softening agents other than the above, there may be exemplified tars, such as coal tar and coal tar pitch; fatty oils, such as castor oil, linseed oil, rape oil, soybean oil and coconut oil; waxes, such as tall oil, beeswax, carnauba wax and lanolin; fatty acids, such as ricinoleic acid, palmitic acid, stearic acid, 12-hydroxystearic acid, montanic acid, oleic acid and erucic acid, and metal salts thereof; synthetic high-polymeric substances, such as petroleum resin, cumarone-indene resin and atactic polypropylene; plasticizers based on ester, such as dioctyl phthalate, dioctyl adipate and dioctyl sebacate; and others including microcrystalline wax, liquid polybutadiene and its modified and hydrogenated products and liquid Thiokol.

The softening agent (j-3) may favorably be employed in an amount of 5-200 parts by weight, preferably 15-150 parts by weight, more preferably 20-80 parts by weight, per 100 parts by weight of the ethylene/α-olefin copolymer rubber (j-2). When the softening agent (j-3) is used in the proportion given above, it is made possible to improve the flowability of the olefinic thermoplastic elastomer composition $(X_2)$ sufficiently without debasing the material properties, such as the heat resistance and the tensile strength, of the foamed body $(X_{F2})$.

The softening agent (j-3) may be added upon the production of the olefinic thermoplastic elastomer (J) or may preliminarily be admixed as an extender oil to, for example, the ethylene/α-olefin copolymer rubber (j-2)

The olefinic thermoplastic elastomer (J) is easy in recycled utilization, since it is not a thermosetting type elastomer such as the conventionally used vulcanized rubber, but is a thermoplastic elastomer.

To the olefinic thermoplastic elastomer (J) to be used according to the present invention, there may be admixed on requirement various additived known per se, such as heat resisting stabilizer, antioxidant, weathering stabilizer, antistatic agent, filler, coloring agent and lubricant, within the range not obstructing the purpose of the present invention.

Production of the Olefinic Thermoplastic Elastomer (J)

The olefinic thermoplastic elastomer (J) to be used according to the present invention can be obtained by subjecting a mixture of the polyolefin resin (j-1) with the ethylene/α-olefin copolymer rubber (j-2) and the optionally incorporated softening agent (j-3) etc. to a dynamic heat treatment.

For the olefinic thermoplastic elastomer (J), there may favorably be employed those which are obtained by subjecting a mixture composed of the polyolefin resin (j-1) and the ethylene/α-olefin copolymer rubber (j-2) with occasionally incorporated ingredient(s), such as the softening agent and so on, to a dynamic heat treatment in the presence of a cross linking agent.

As the cross-linking agent which can be used upon the dynamic heat treatment, those which are usually employed in thermosetting rubbers may be used, such as organic peroxides, sulfur, phenolic resins, amino resins, quinone and its derivatives, compounds based on amine, azo compounds, epoxy compounds and isocyanates. Among them, especially, organic peroxides are preferred.

As the organic peroxide, there may concretely be exemplified dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauloyl peroxide and tert-butylcumyl peroxide.

Among them, preference is given, in view of odour and scorching stability, to 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)-benzene, 1,1-bis(tert-butylperoxy)-3,3,5-trimethylcyclohexane and n-butyl-4,4-bis(tert-butylperoxy) valerate, wherein, in particular, 1,3-bis(tert-butylperoxyisopropyl)benzene is at most preferred.

According to the present invention, the organic peroxide is used in an amount of 0.05-3 parts by weight, preferably 0.1-2 parts by weight, per 100 parts by weight of the mixture of the polyolefin resin (j-1) and the ethylene/α-olefin copolymer rubber (j-2) with occasionally incorporated ingredient(s), such as the softening agent etc.

For the cross linking treatment using the organic peroxide, it is possible to incorporate an assistant for the peroxy-cross linking, such as sulfur, p-quinonedioxime, p,p'-dibenzoylquinonedioxime, N-methyl-N-4-dinitrosoaniline, nitrosobenzene, diphenylguanidine and trimethylolpropane-N,N'-m-phenylenedimaleimide, or a polyfunctional methacrylate monomer, such as divinylbenzene, triallyl cyanurate, ethylene glycol dimethacrylate, diethylene glycol dimethacrylate, polyethylene glycol dimethacrylate, trimethylolpropane trimethacrylate or allyl methacrylate, or, further, a polyfunctional vinyl monomer, such as vinyl butyrate or vinyl stearate.

By using the compound as above, a uniform and mild cross-linking reaction can be expected. In particular, divinylbenzene is at most preferable for the present invention. Divinylbenzene is easy in handling, has a better compatibility with the polyolefin resin (j-1) and the ethylene/α-olefin copolymer rubber (j-2) constituting main components of the material to be cross-linked and reveals a function of solubilizing the organic peroxide to act as a dispersant, so that an olefinic thermoplastic elastomer (J) exhibiting uniform cross-linking effect by the heat treatment and having a better balance between the flowability and the material properties can be obtained.

The above-mentioned cross-linking assistant or the polyfunctional vinyl monomer may favorably be used in an amount in the range from 0.1 to 3% by weight, preferably from 0.3 to 2% by weight, based on the total weight of the mass to be cross-linked. When the amount of the cross-linking assistant or the polyfunctional vinyl monomer is in the above-mentioned range, not only the cross-linking assistant but also the polyfunctional vinyl monomer will never remain in the elastomer as unreacted monomer, so that the resulting thermoplastic elastomer does not suffer from alteration of the material properties due to the heating hysteresis and is superior in the flowability.

The word "dynamic heat treatment" means that: the components given above are kneaded in a molten (fused) state.

As the kneading apparatus, known ones, such as for example, open-type mixing roll and non-open type ones, such as Bumbury's mixer, extruder, kneader and continuous mixer, may be employed. Among them, non-open type kneading apparatuses are preferred, wherein the kneading procedure may favorably be effected under an inert gas atmosphere, such as nitrogen gas or carbon dioxide gas.

The temperature upon the dynamic heat treatment may usually be at 150-280° C., preferably 170-240° C., and the kneading duration may favorably be 1-20 minutes, preferably 1-5 minutes. The shearing force imposed may favorably be 10-1,000 sec$^{-1}$, preferably 100-1,000 sec$^{-1}$, in terms of shearing velocity.

The olefinic thermoplastic elastomer (J) to be used desirably according to the present invention may favorably have a gel content, as calculated in the manner given below, of 10% by weight or higher, preferably 20% by weight or higher, especially preferably 45% by weight or higher. When the gel content is 10% by weight or higher, the resulting foamed body ($X_{F2}$) exhibits superior rubbery properties, such as heat resistance, tensile strength, flexibility, weatherability and repulsive resilience, and is suitable for recycled utilization.

(Method for Determining the Gel Content)

About 100 mg of a sample of the thermoplastic elastomer are weighed off and cut into grains of a size of 0.5 mm ×0.5 mm ×0.5 mm and the resulting grains are soaked in 30 ml of cyclohexane in a sealed vessel at 23° C. for 48 hors. The so-soaked granular sample is taken out on a filter paper and is dried at room temperature for over 72 hours until a constant weight is reached.

The value calculated by subtracting the weight of cyclohexane-insoluble ingredients other than the polymer components (for example, fibrous filler, filler and pigments) from the weight of the above dried residual matter is regarded as the "corrected final weight of (Y)".

On the other hand, the value calculated by subtracting the weight of cyclohexane-soluble ingredients other than the polymer components (for example, softening agent) and the weight of cyclohexane-insoluble ingredients other than the polymer components (for example, fibrous filler, filler and pigments) from the weight of the above dried residual matter is regarded as the "corrected initial weight of (X)".

The gel content (content of cyclohexane-insoluble polymer) is calculated by the equation:

$$\text{Gel cont. (wt. \%)} = \frac{[\text{corrected final wt. }(Y)]}{[\text{corrected init. wt. }(X)]} \times 100$$

The olefinic thermoplastic resin (K)

The olefinic thermoplastic resin (K) to be used according to the present invention is a polymeric or copolymeric product having an olefin content in the range from 50 to 100 mole %, preferably from 60 to 100 mole %, and an MFR (ASTM D-1238-65T, 230° C., 2.16 kg load) in the range from 0.01 to 2 g/10 min., preferably from 0.02 to 2 g/10 min. As the olefinic thermoplastic resin (K), there may be recited, for example, the polyolefin resin (j-1) which satisfy the above-mentioned material property condition.

For the olefinic thermoplastic resin (K), homopolymers of propylene and propylene/α-olefin copolymers having propylene contents of at least 50 mole %, preferably in the range from 60 to 95 mole %, are especially favorable.

Due to that the MFR value of the olefinic thermoplastic resin (K) is within the range from 0.01 to 2 g/10 min., the melt tension of the resulting olefinic thermoplastic elastomer composition ($X_2$) can be held at a high value, whereby a foamed body ($X_{F2}$) of higher foaming expansion ratio can be obtained.

The olefinic thermoplastic resin (K) may be incorporated either individually or in a combination of two or more kinds.

The olefinic thermoplastic resin (K) may be used in an amount of 1-20 parts by weight, preferably 1-10 parts by weight, per 100 parts by weight of the olefinic thermoplastic elastomer (J). When the olefinic thermoplastic resin (K) is used in the above-mentioned amount, the resulting foamed body ($X_{F2}$) is superior in the flexibility.

The olefinic thermoplastic elastomer (K) of the present invention is characterized in that it is used concurrently with the olefinic thermoplastic elastomer (J) produced through a dynamic heat treatment, while the olefinic thermoplastic resin (K) itself is not subjected to any dynamic heat treatment. When, on the production of the olefinic thermoplastic elastomer (J), the polyolefin resin (j-1) and the ethylene/α-olefin copolymer rubber (j-2), mixed with an organic peroxide etc., are kneaded with heating, while admixing thereto the olefinic thermoplastic resin (K), any contemplated foamed body ($X_{F2}$) may, according to certain kind of the olefinic thermoplastic resin (K), not be obtained, because of that the olefinic thermoplastic resin (K) may be subjected to thermal decomposition into lower molecular weight products or due to that a gellation may occur by cross linking by heat.

The substrate layer of the foamed laminate according to the present invention is a foamed body which can be obtained by foaming up an olefinic foamable composition ($X_3$) comprising the olefinic thermoplastic elastomer (J), the olefinic thermoplastic resin (K) and the foaming agent (B) described previously.

The foaming agent (B) may favorably be used usually in an amount of 0.5-20 parts by weight, preferably 1-10 parts by weight, per 100 parts by weight of the olefinic thermoplastic elastomer (J).

It is possible, if necessary, that a foaming assistant may be admixed to the olefinic foamable composition ($X_3$). As the foaming assistant, compounds containing a metal, such as zinc, calcium, lead, iron and barium; organic acids, such as citric acid, salicylic acid, phthalic acid, stearic acid and oxalic acid; and urea and its derivatives are employed. The foaming assistant may usually be employed favorably in an amount of 0.1-20 parts by weight, preferably 1-10 parts by weight, per 100 parts by weight of the olefinic thermoplastic elastomer (J). The foaming assistant functions to lower the decomposition temperature of the foaming agent, to accelerate the decomposition thereof and to build up uniform bubbles.

The olefinic foamable composition ($X_3$) may contain, if necessary, an inorganic porous powdery substance functioning to adsorb inorganic gases, such as zeolite, an adsorbent resin having a large capacity for adsorbing inorganic gases, such as polycarbonate resin, and others including a nucleating agent for the foaming, for the purpose of effecting the foaming at a high foaming expansion ratio in a uniform way.

The olefinic foamable composition ($X_3$) may further contain, if necessary, various additives known per se, such as a filler, heat resisting stabilizer, antioxidant, weathering stability, antistatic agent, wetting agent, lubricant including metal soap and wax, pigment, dyestuff, fire-retarding agent and blocking inhibitor, in amounts within the range not obstructing the purpose of the present invention.

For the filler to be incorporated in the olefinic foamable composition ($X_3$), those which are usually used in rubbers may be favorable and there may concretely be exemplified calcium carbonate, calcium silicate, clay, kaolin, talc, silica, diatomaceous earth, powder mica, asbestos, barium sulfate, aluminum sulfate, calcium sulfate, magnesium carbonate, molybdenum disulfide, glass fiber, glass beads, Shirasu balloon, graphite and alumina.

The filler may favorably be incorporated usually in an amount of 40 parts by weight or less, preferably in the range from 1 to 30 parts by weight, per 100 parts by weight of the olefinic thermoplastic elastomer (J).

Preparation of the Olefinic Foamable Composition ($X_3$)

The olefinic foamable composition ($X_3$) may be prepared by compounding the olefinic thermoplastic elastomer (J), the olefinic thermoplastic resin (K) and the foaming agent (B) together with the optionally incorporated other ingredients, such as the foaming assistant and wetting agent. For the compounding, a method may be used, in which the olefinic thermoplastic elastomer (J) is mixed with the olefinic thermoplastic resin (K) and the foaming agent (B) and, if the optional ingredients, such as the foaming assistant and wetting agent, are to be incorporated, these optional ingredients are compounded upon blending the olefinic thermoplastic resin (K) and the foaming agent (B). The olefinic thermoplastic resin (K) and the foaming agent (B) may be compounded either simultaneously or each individually. In the case of compounding individually, the olefinic thermoplastic elastomer (J) is first mixed with the olefinic thermoplastic resin (K) and, then, the foaming agent (B) is admixed thereto, though the mixing sequence may be reversed.

If the olefinic thermoplastic resin (K) and/or the foaming agent (B) is compounded on the production of the olefinic thermoplastic elastomer (J), no contemplated foamed body ($X_{F2}$) can be obtained. When the olefinic thermoplastic resin (K) and/or the foaming agent (B) is compounded upon the production of the olefinic thermoplastic elastomer (J), the olefinic thermoplastic resin (K) may, according to certain kind of the olefinic thermoplastic resin (K), be pyrolyzed into lower molecular products or a gellation due to cross linking may occur by heat, whereby the melt viscosity may become greatly deviated from the value necessary for obtaining the contemplated foamed body ($X_{F2}$) or a phenomenon of blowing off may occur on decomposition of the foaming agent (B).

For concrete practice of compounding the olefinic thermoplastic elastomer (J), the olefinic thermoplastic resin (K) and the foaming agent (B), there may be used, for example, a method, in which a pelletized product of the olefinic thermoplastic elastomer (J), the olefinic thermoplastic resin (K) and the foaming agent (B) are once kneaded on, for example, a tumbler type Bravender, V-shaped Bravender, a ribbon blender or a Henschel mixer, followed by, if necessary, further kneading on an open type mixing roll or on a non-open type kneading apparatus, such as Bumbury's mixer, extruder, kneader or continuous mixer.

The weathering stabilizer, heat-resisting stabilizer, antioxidant, pigment, dyestuff and so on may be blended at any process step given above.

By heating the olefinic foamable composition ($X_3$), the foamed body ($X_{F2}$) can be obtained.

In the case where the foamed body ($X_{F2}$) is used as the substrate layer, it is also possible, in a similar manner as in the case of the foamed body ($X_{F1}$), to use, as the raw material for the skin layer, at least one selected from the group consisting of the olefinic raw materials 1) to 5) given below:

1) The ultrahigh molecular weight polyolefin resin (Y) mentioned previously which is an ultrahigh molecular weight polyolefin resin having an intrinsic viscosity (72) of 3.5-8.3 dl/g, as determined in decalin of 135° C.

2) An olefinic thermoplastic elastomer composition (Z) containing, per 100 parts by weight of the olefinic thermoplastic elastomer (C), at least one lubricant ($Z_L$) selected from the group consisting of an organopolysiloxane (D) in an amount of 0.5-25 parts by weight, a fluorine-containing polymer (E) in an amount 0.5-10 parts by weight, an antistatic agent (F) in an amount of 0.5-10 parts by weight, a polyolefin resin (G) in an amount of 5-200 parts by weight, a fatty acid amide in an amount of 0.01-5 parts by weight, a mineral oil in an amount of 0.5-10 parts by weight, a metal soap in an amount of 0.01-5 parts by weight, an ester in an amount of 0.01-5 parts by weight, calcium carbonate in an amount of 0.01-5 parts by weight and a silicate in an amount of 0.01-5 parts by weight, each in the proportion as given.

3) An olefinic thermoplastic elastomer composition ($Z_1$) containing, per 100 parts by weight of the olefinic thermoplastic elastomer (C), at least one selected from the group consisting of an organopolysiloxane (D) in an amount of 0.5-25 parts by weight, a fluorine-containing polymer (E) in an amount of 0.5-10 parts by weight and an antistatic agent in an amount of 0.5-10 parts by weight, each in the proportion as given.

4) An olefinic thermoplastic elastomer composition ($Z_2$) containing a polyolefin resin (G) in an amount of 5-200 parts by weight, per 100 parts by weight of the olefinic thermoplastic elastomer (C).

5) An olefinic thermoplastic elastomer composition ($Z_3$) containing, per 100 parts by weight of the olefinic thermoplastic elastomer (C), at least one selected from the group consisting of an organopolysiloxane (D) in an amount of 0.5-25 parts by weight, a fluorine-containing polymer (E) in an amount of 0.5-10 parts by weight, an antistatic agent (F) in an amount of 0.5-10 parts by weight, a fatty acid amide in an amount of 0.01-5 parts by weight, a mineral oil in an amount of 0.5-10 parts by weight, a metal soap in an amount of 0.01-5 parts by weight, an ester in an amount of 0.01-5 parts by weight, calcium carbonate in an amount of 0.01-5 parts by weight and a silicate in an amount of 0.01-5 parts by weight, each in the proportion as given, and, further, a polyolefin resin (G) in an amount of 5-200 parts by weight.

As the olefinic thermoplastic elastomer (C), the olefinic thermoplastic elastomer (J) may also be employed.

The foamed laminate based on olefin according to the present invention is a laminate produced by laminating a skin layer made of the ultrahigh molecular weight polyolefin resin (Y), the olefinic thermoplastic elastomer composition (Z) or any one of the olefinic thermoplastic elastomer compositions $(Z_1)$ to $(Z_3)$ on substrate layer made of the foamed body $(X_{F1})$ or $(X_{F2})$ given above. The skin layer may be laminated on the substrate layer covering the entire area or partial area of the substrate layer or it is permissible that other layer(s) is(are) laminated. In the case where skin layer is laminated covering a partial area of the substrate layer, the residual area not covered by the skin layer may be held exposed. The substrate layer and the skin layer may be laminated using an adhesive, though preferably they are fused together. While there is no special limitation as to the thickness of the foamed laminate, it is favorable that the substrate layer has a thickness of 0.1-50 mm, preferably 0.5-45 mm, and the skin layer has a thickness of 5 μm 10 mm, preferably 10 μm -8 mm. The foaming expansion ratio of the foamed body $(X_{F1})$ or $(X_{F2})$ may favorably be in the range from 1.1 to 20 times, preferably from 2 to 10 times the original volume, though there is no special limitation therefor. According to the present invention, even foamed bodies $(X_{F1})$ having higher expansion ratios of 2 times or higher may easily be molded, since the ethylenic thermoplastic elastomer (A) can foam up sufficiently. Also, even foamed bodies $(X_{F2})$ having higher expansion ratios of 2 times or higher may easily be molded, since the olefinic thermoplastic elastomer (K) can foam up sufficiently.

The foamed laminate based on olefin according to the present invention may exhibit a soft hand touch, since the substrate layer can be made at a high expansion ratio as indicated above and is superior in the appearance, abrasion resistance, durability and sliding performance. In particular, it is excellent in the abrasion resistance under hard conditions. The foamed laminate according to the present invention can be produced in an easy manner and reveals a high economical efficiency due to permission of recycled utilization.

The foamed laminate based on olefin according to the present invention is obtained by providing the substrate layer of the foamed body $(X_{F1})$ or $(X_{F2})$ and making up the skin layer from the ultrahigh molecular weight polyolefin resin (Y), the olefinic thermoplastic: elastomer composition (Z) or any one of the olefinic. thermoplastic elastomer compositions $(Z_1)$ to $(Z_3)$ and laminating these layers. The practical manner of lamination may vary according to the shape, size, material properties required and so on and there is no special limitation therefor, while there may be exemplified a method in which the substrate layer and the skin layer are co-extruded simultaneously using a multilayer extrusion molding machine, followed by heat fusing them together. The ethylenic thermoplastic elastomer composition $(X_1)$ foams up upon the heat fusing under co-extrusion to form the foamed body $(X_{F1})$ which builds up the substrate layer. The olefinic foamable composition $(X_3)$ foams up upon the heat fusing under co-extrusion to form the foamed body $(X_{F2})$ which build up the substrate layer. Such a heat fusing technique requires no adhesive and permits to obtain a foamed laminate easily by a single process step in an easy manner, wherein the thereby obtained interlayer adhesion between the substrate layer and the skin layer is firm.

The foamed laminate based on olefin according to the present invention can be used favorably, for example, for automobile parts, such as automobile weather strips, and for architectural materials, such as gaskets and sealing elements. For the automobile weather strips, there may be exemplified door weather strip, hood weather strip, trunk room weather strip, sunroof weather strip, ventilator weather strip and corner strip. As the architectural materials, there may be exemplified gaskets, airtight elements, jointing parts and damper seal at door top. For others, products for leisure and sports, such as golf club grip, grip of baseball bat, swimming fins and diving goggles; protecting cover for hoses; and cushions.

FIG. 1 shows the sectional construction of one embodiment of an automobile weather strip in which the foamed laminate based on olefin according to the present invention is employed. The automobile weather strip 1 shown in FIG. 1 is constructed from a thin core plate 2 and two contact seal lugs 3 arranged on the core plate 2 in a form of curved fins so as to provide for a tight contact onto the window glass to establish a contact seal. The contact seal lug 3 is made of the foamed laminate based on olefin according to the present invention prepared by laminating the substrate layer 4 and the skin layer 5, wherein the skin layer 5 is disposed on the side for contacting with the window glass.

The slide contact element according to the present invention is made of the foamed laminate based on olefin according to the present invention. The slide contact element according to the present invention reveals a soft hand touch inherited from the foamed laminate based on olefin according to the present invention and is superior in the appearance, abrasion resistance, durability and sliding performance. It can be produced easily and, in addition, it permits easy recycled use, since it is made principally from olefinic polymers as the raw material, so that a superior economical efficiency is provided.

As described above, the foamed laminate based on olefin according to the present invention is prepared at a high foaming expansion ratio and provides a soft hand touch and, in addition, it is superior in the appearance, abrasion resistance, durability and sliding performance. Due to the superior abrasion resistance under hard conditions, it can favorably serve for, for example, automobile weather strips and the like. The laminate according to the present invention can be produced easily and is easy in the recycled use due to the use of, as the principal raw material, olefinic polymers, providing, thus, a superior economical efficiency.

EXAMPLES

Below, the present invention is described in more detail by way of Examples, though the present invention is by no means restricted by these Examples.

Example 1-1

(1) Production of the Ethylenic Thermoplastic Elastomer (A-1)

There were blended on a Henschel mixer 30 parts by weight of a linear low density polyethylene (density=0.920 g/cm$^3$, MFR=2.1 g/10 min., ethylene content=97.0 mole % and 4-methyl-1-pentene content=3.0 mole %) and 70 parts by weight of an ethylene/propylene/dicyclopentadiene copolymer rubber (ethylene content=77 mole %, Mooney viscosity ML$_{1+4}$ (100° C.)=145 and iodine value=12). Then, on a double shaft extruder having an L/D of 30 and a screw diameter of 50 mm, a dynamic heat treatment was effected at 220° C. under a nitrogen atmosphere and the resulting mass was extruded to produce a pelletized product of an ethylenic thermoplastic elastomer (A-1). A cylindrical test specimen of a thickness of 12.7 mm and a diameter of 29.0 mm was prepared from the resulting ethylenic thermoplastic elastomer (A-1) by injection molding, wherefor compression set was observed (JIS K 6262, 70° C., 22 hours), which resulted in a value of 46%. On the other hand, the pelletized product was examined for its melt flow rate (JIS K 7120, 230° C., 10 kg load), which resulted in a value of 2 g/10 min.

(2) The Ultrahigh Molecular Weight Polyethylene Composition (Y-1)

The composition (Y-1) had an intrinsic viscosity (η) of 7.0 dl/g.

This is an ultrahigh molecular weight polyethylene composition which is composed of an ultrahigh molecular weight polyethylene resin (y-1) having an intrinsic viscosity (η) of 28 dl/g as determined in decalin at 135° C. and a polyethylene resin (y-2) having an intrinsic viscosity (η) of 0.73 dl/g as determined in decalin at 135° C. in a weight proportion of 23/77.

(3) Production of the Laminate

There were blended 100 parts by weight of the ethylenic thermoplastic elastomer (A-1) of the above (1) and 3.0 parts by weight of a mixture (B-1) composed of 50 mole % of citric acid and 50 mole % of sodium hydrogen-carbonate on a tumbler type Bravender to prepare a foamable composition. This foamable composition was extrusion-molded at a die temperature of 150° C. to effect a foaming molding to form a core plate and substrate layer portions, while at the same time the ultrahigh molecular weight polyethylene composition (Y-1) of the above (2) was co-extruded to form a skin layer, whereupon the substrate layer and the skin layer were heat-fused to thereby produce a weather strip as shown in FIG. 1. The substrate layer had a thickness of 2 mm and the skin layer had a thickness of 100 μm. The foaming expansion ratio of the resulting weather strip was 4.8 times the original composition volume.

The so-produced weather strip was assembled on a window frame for testing, whereupon a window glass having a thickness of 3.2 mm was inserted therein, in order to carry out a durability test (repeating test of up-and-down motion of the window glass). The weather strip had withstood 50,000 repetitions of up-and-down motion without suffering from any yielding phenomenon nor abrasion and had maintained its function as weather strip.

Example 1-2

Using 30 parts by weight of the linear low density polyethylene as used in Example 1-1, 70 parts by weight of the ethylene/propylene/dicyclopentadiene copolymer rubber as used in Example 1-1 and 40 parts by weight of a softening agent based on mineral oil (a product of Idemitsu Kosan Co., Ltd. with trademark PW-380, a paraffinic oil), an ethylenic thermoplastic elastomer (A-2) was obtained in the same way as in Example 1-1. For the resulting ethylenic thermoplastic elastomer (A-2), compression set and MFR were determined in the same manner as in Example 1-1. A compression set of 46% and an MFR of 4 g/10 min. were observed.

Then, using this ethylenic thermoplastic elastomer (A-2), a foamable composition was prapared in the same way as in Example 1-1, from which a weather strip was produced together with the skin layer same as that prepared in Example 1-1. For this weather strip, a durability test was performed. This weather strip had withstood 50,000 repetitions of up-and-down motion and maintained its function as weather strip. The foaming expansion ratio of this weather strip was 3.7 times the original composition volume.

Example 1-3

Using 15 parts by weight of the linear low density polyethylene as used in Example 1-1, 85 parts by weight of the ethylene/propylene/dicyclopentadiene copolymer rubber as used in Example 1-1 and 20 parts by weight of a propylene/ethylene random copolymer (PP-1) (MFR=0.5 g/10 min., ethylene content=4 mole %), an ethylenic thermoplastic elastomer (A-3) was prepared in the same manner as in Example 1-1. For the resulting ethylenic thermoplastic elastomer (A-3), compression set and MFR were determined in the same way as in Example 1-1. A compression set of 55% and an MFR of 2 g/10 min. were observed.

Then, using this ethylenic thermoplastic elastomer (A-3), a foamable composition was prepared in the same way as in Example 1-1, from which a weather strip was produced together with the skin layer same as that prepared in Example 1-1. For this weather strip, a durability test was performed. This weather strip had withstood 50,000 repetitions of up-and-down motion and maintained its function as weather strip. The foaming expansion ratio of this weather strip was 3.0 times the original composition volume.

Example 1-4

Using 15 parts by weight of the linear low density polyethylene as used in Example 1-1, 85 parts by weight of the ethylene/propylene/dicyclopentadiene copolymer rubber as used in Example 1-1 and 20 parts by weight of a homopolymer of propylene (PP-2) (MFR=1.5 g/10 min.), an ethylenic thermoplastic elastomer (A-4) was prepared in the same manner as in Example 1-1. For the resulting ethylenic thermoplastic elastomer (A-4), compression set and MFR were determined in the same way as in Example 1-1. A compression set of 57% and an MFR of 3 g/10 min. were observed.

Then, using this ethylenic thermoplastic elastomer (A-4), a foamable composition was prepared as in Example 1-1, from which a weather strip was produced together with the skin layer same as that prepared in Example 1-1. For this weather strip, a durability test was performed. This weather strip had withstood 50,000 repetitions of up-and-down motion and maintained its function as weather strip. The foaming expansion ratio of this weather strip was 2.8 times the original composition volume.

Example 1-5

Using 30 parts by weight of the linear low density polyethylene as used in Example 1-1, 110 parts by weight of an oil-extended ethylene/propylene/dicyclopentadiene copolymer rubber obtained by compounding the ethylene/propylene/dicyclopentadiene copolymer rubber as used in Example 1-1 with 40 parts by weight of an extender oil (a product of Idemitsu Kosan Co., Ltd. with trademark PW-380, a paraffinic oil), an ethylenic thermoplastic elastomer (A-5) was obtained in the same way as in Example 1-1. For the resulting ethylenic thermoplastic elastomer (A-5), compression set and MFR were determined in the same manner as in Example 1-1. A compression set of 43% and an MFR of 4 g/10 min. were observed.

Then, using this ethylenic thermoplastic: elastomer (A-5), a foamable composition was prepared in the same way as in Example 1-1, from which a weather strip was produced together with the skin layer same as that prepared in Example 1-1. For this weather strip, a durability test was performed. This weather strip had withstood 50,000 repetitions of up-and-down motion and maintained its function as weather strip. The foaming expansion ratio of this weather strip was 3.8 times the original composition volume.

Example 1-6

(1) Production of an Olefinic Thermoplastic Elastomer (C-1)

There were kneaded on a Bumbury's mixer 60 parts by weight of an ethylene/propylene/5-ethylidene-2-norbornene copolymer rubber (ethylene content=70 mole %, iodine value=12, Mooney viscosity $ML_{1+4}$ (100° C.)=120) and 40 parts by weight of a polypropylene {MFR (ASTM D-1238-65T, 230° C., 2.16 kg load)=13 g/10 min., density=0.91 g/cm$^3$, degree of crystallinity by X-ray diffraction=72%} at 180° C. under a nitrogen atmosphere for 5 minutes. Then, this kneaded blend was passed through rolls into a sheet and this sheet was cut by a sheet cutter into dice-formed pellets. Then, this pelletized product was blended with 0.2 part by weight of 1,3-bis(tert-butylperoxyisopropyl)benzene and 0.2 part by weight of divinylbenzene on a Henschel mixer. Thereafter, the resulting blend was extruded by a double shaft extruder having an L/D of 40 and a screw diameter of 50 mm at 200° C. under a nitrogen atmosphere to obtain an olefinic thermoplastic elastomer (C-1). The resulting olefinic thermoplastic elastomer (C-1) had an gel content of 78% by weight as determined by the method given above.

(2) Production of the Laminate

There were kneaded 100 parts by weight of the olefinic thermoplastic elastomer (C-1) of the above (1) and 2 parts by weight of a silicone oil (D-1) (a product of Toray-Dow Corning K.K. with trademark SH200-3000 cSt) on a double shaft extruder to obtain an olefinic thermoplastic elastomer composition (Z1-1) for the skin layer.

This olefinic thermoplastic elastomer composition (Z1-1) was co-extruded together with the foamable composition same as that in Example 1-1 to produce a weather strip, for which a durability test was carried out. This weather strip had withstood the 50,000 repetition test and maintained its function as weather strip.

Example 1-7

There were kneaded on a double shaft extruder 100 parts by weight of the olefinic thermoplastic elastomer (C-1) obtained in Example 1-6, 2 parts by weight of the silicone oil (D-1) used in Example 1-6 and 14 parts by weight of a masterbatch of silicone oil/polypropylene (D-2) {a product of Toray-Dow Corning K.K. with trademark BY27-002 (content of the ultrahigh molecular weight silicone oil=50% by weight)} to obtain an olefinic thermoplastic elastomer composition (Z1-2) for the skin layer.

This olefinic thermoplastic elastomer composition (Z1-2) was co-extruded together with the foamable composition same as that in Example 1-1 to produce a weather strip, for which a durability test was carried out. This weather strip had withstood the 50,000 repetition test and maintained its function as weather strip.

Example 1-8

There were kneaded on a double shaft extruder 100 parts by weight of the olefinic thermoplastic elastomer (C-1) obtained in Example 1-6 and 3 parts by weight of a fluorine-containing polymer (E-1) {a product of Sumitomo Three M K.K. with trademark DYNAMER FX-9613 (with a content of the fluorine-containing polymer of 90%)} to obtain an olefinic thermoplastic elastomer composition (Z1-3) for the skin layer.

This olefinic thermoplastic elastomer composition (Z1-3) was co-extruded together with the foamable composition same as that in Example 1-1 to produce a weather strip, for which a durability test was carried out. This weather strip had withstood the 50,000 repetition test and maintained its function as weather strip.

Example 1-9

There were kneaded on a double shaft extruder 100 parts by weight of the olefinic thermoplastic elastomer (C-1) obtained in Example 1-6 and 3 parts by weight of an antistatic agent (F-1) (a product of Kao Corporation with trademark ELECTROSTRIPPER TS-6B) to obtain an olefinic thermoplastic elastomer composition (Z1-4) for the skin layer.

This olefinic thermoplastic elastomer composition (Z1-4) was co-extruded together with the foamable composition same as that in Example 1-1 to produce a weather strip, for which a durability test was carried out. This weather strip had withstood the 50,000 repetition test and maintained its function as weather strip.

Example 1-10

There were kneaded on a double shaft extruder 100 parts by weight of the olefinic thermoplastic elastomer (C-1) obtained in Example 1-6 and 10 parts by weight of the ultrahigh molecular weight polyolefin composition (Y-1) used in Example 1-1 to obtain an olefinic thermoplastic elastomer composition (Z1-5) for the skin layer.

This olefinic thermoplastic elastomer composition (Z1-5) was co-extruded together with the foamable composition same as that in Example 1-1 to produce a weather strip, for which a durability test was carried out. This weather strip had withstood the 50,000 repetition test and maintained its function as weather strip.

Example 1-11

There were kneaded on a double shaft extruder 100 parts by weight of the olefinic thermoplastic elastomer (C-1) obtained in Example 1-6, 100 parts by weight of the ultrahigh molecular weight polyolefin composition (Y-1) used in Example 1-1 and 2 parts by weight of the silicone oil (D-1) to obtain an olefinic thermoplastic elastomer composition (Z1-6) for the skin layer.

This olefinic thermoplastic elastomer composition (Z1-6) was co-extruded together with the foamable composition same as that in Example 1-1 to produce a weather strip, for which a durability test was carried out. This weather strip had withstood the 50,000 repetition test and maintained its function as weather strip.

Example 1-12

There were kneaded on a double shaft extruder 100 parts by weight of the olefinic thermoplastic elastomer (C-1) obtained in Example 1-6, 2 parts by weight of the silicone oil (D-1) used in Example 1-1 and 30 parts by weight of a polypropylene (G-1) {MFR (ASTM D-1238-65T, 230° C., 2.16 kg load)=13 g/10 min., density=0.91 g/cm$^3$)} to obtain an olefinic thermoplastic elastomer composition (Z1-7) for the skin layer.

This olefinic thermoplastic elastomer composition (Z1-7) was co-extruded together with the foamable composition same as that in Example 1-1 to produce a weather strip, for which a durability test was carried out. This weather strip had withstood the 50,000 repetition test and maintained its function as weather strip.

Comparative Example 1-1

Using a conventional weather strip (having a laminate structure in which a nylon film is fitted on a layer of a soft vinyl chloride resin layer), the durability test was carried out in the same way. In this test, a breakdown occurred on the face contacting with the window glass after 25,000 repetitions, whereby the friction resistance on the window glass increased considerably to thereby render practical use impossible.

The conditions of the dynamic heat treatment in the production of the ethylenic thermoplastic elastomers (A-1), (A-2), (A-3), (A-4) and (A-5) are given in Table 1 below.

TABLE 1

| Elastomers | | A-1 | A-2 | A-3 | A-4 | A-5 |
|---|---|---|---|---|---|---|
| Composition | | | | | | |
| PE | *1 | 30 | 30 | 15 | 15 | 30 |
| EPDM | *2 | 70 | 70 | 85 | 85 | — |
| O-ext. EPDM | *3 | — | — | — | — | 110 |
| PP-1 | *4 | — | — | 20 | — | — |
| PP-2 | *5 | — | — | — | 20 | — |
| Paraff. oil | *6 | — | 40 | — | — | — |
| Prod. conditn. | | | | | | |
| T | *7 | 223 | 222 | 239 | 238 | 225 |
| P | *8 | 50 | 50 | 50 | 50 | 50 |
| Q | *9 | 2800 | 2800 | 2800 | 2800 | 2800 |
| R | *10 | 50 | 50 | 50 | 50 | 50 |
| S | *11 | 280 | 280 | 280 | 280 | 280 |
| U | *12 | 15.7 | 15.7 | 15.7 | 15.7 | 15.7 |
| Value of formula (1) | *13 | 6.42 | 6.41 | 6.58 | 6.57 | 6.44 |

Notes:
Numbers given in the column of composition are those based on weight parts.
*1 PE denotes linear low density polyethylene.
*2 EPDM represents ethylene/propylene/dicyclo-pentadiene copolymer rubber.
*3 O-ext. EPDM denoted an oil-extended ethylene/propylene/dicyclopentadiene copolymer composed of 100 parts by weight of ethylene/propylene/dicyclopentadiene copolymer rubber blended with 40 parts by weight of a paraffinic extender oil (a product of Idemitsu Kosan Co., Ltd. with trademark PW-380).
*4 pp-1 represents a propylene/ethylene copolymer.
*5 pp-2 represents a homopolymer of propylene.
*6 Paraff. oil represents a softening agent based on mineral oil (a product of Idemitsu Kosan Co., Ltd. with trademark PW-380).
*7 T represents the resin temperature (° C.) at the die outlet.
*8 P represents the screw diameter in mm of the double shaft extruder.
*9 Q represents the maximum shearing velocity in $sec^{-1}$ imposed in the double shaft extruder.
*10 R represents the extrusion throughput in kg/hr of the double shaft extruder.
*11 S represents the revolution frequency per second in rps.
*12 U represents the distance in mm of the clearance between the barrel inner face and the kneading segment of the screw at the narrowest portion thereof.
*13 The value calculated by the formula $[\{(T - 130)/100\} + 2.2 \cdot \log P + \log Q - \log R]$ (1)

Components used in the subsequent Examples and Comparative Examples are as given below:
A polyolefin resin (j-11):
    A propylene/ethylene block copolymer which has an MFR (ASTM D-1238-65T, 230° C., 2.16 kg load) of 50 g/10 min., a density of 0.910 g/cm³ and an ethylene content of 8 mole %.

An ethylene/α-olefin copolymer rubber (j-21):
    An ethylene/propylene/5-ethylidene-2-norbornene copolymer rubber which has an ethylene content of 63 mole %, an iodine value of 13 and a Mooney viscosity [$ML_{1+4}$(100° C.)] of 100.
An oil-extended ethylene/α-olefin copolymer rubber (j-22):
    This is prepared by adding to the ethylenic rubber (j-21) a softening agent (j-31) as given below.
A softening agent (j-31):
    This is a paraffinic process oil (a product of Idemitsu Kosan Co., Ltd. with trademark PW-380).
An olefinic thermoplastic resin (K-1):
    This is a homopolymer of propylene having an MFR (ASTM D-1238-65T, 230° C0, 2.16 kg load) of 0.3 g/10 min. and a density of 0.910 g/cm³
A foaming agent (B-2):
    This is azodicarbonamide.
An ultrahigh molecular weight polyolefin composition (Y-1):
    An ultrahigh molecular weight polyethylene composition which has an intrinsic viscosity (72) of 7.0 dl/g as determined in decalin at 135° C. and a density of 0.965 g/cm³.
    The weight ratio of [an ultrahigh molecular weight polyethylene {(η)=28 dl/g}]/[a low molecular weight polyethylene {(η)=0.73 dl/g}]=23/77.
A rubber (c-11):
    An ethylene/propylene/5-ethylidene-2-norbornene copolymer rubber which has an ethylene content of 70 mole %, an iodine value of 12 and a Mooney viscosity [$ML_{1+4}$(100° C.)] of 120.
A polyolefin resin (c-21):
    A propylene/ethylene block-copolymer which has an MFR (ASTM D-1238-65T, 230° C., 2.16 kg load) of 13 g/10 min., a density of 0.91 g/cm³ and an ethylene content of 3 mole %.
An organopolysiloxane (D-1):
    This is a silicone oil {a product of Toray-Dow Corning K.K. with trademark SH200 (3000 cSt)}.
An organopolysiloxane (D-2):
    This is a silicone oil/polypropylene masterbatch {a product of Toray-Dow Corning K.K. with trademark BY27-002 (having an ultrahigh molecular weight silicone oil content of 50% by weight)}.
A fluorine-containing polymer (E-1):
    A product of Sumitomo Three M K.K. with trademark DYNAMER FX-9613 (Content of the fluorine-containing polymer of 90%).
An antistatic agent (F-1):
    A product of Kao Corporation with trademark ELECTROSTRIPPER TS-6B.
A polyolefin resin (G-2):
    A propylene/ethylene block-copolymer which has an MFR (ASTM D-1238-65T, 230° C., 2.16 kg load) of 13 g/10 min., a density of 0.91 g/cm³ and an ethylene content of 3 mole %.

Example 2-1

(1) Production of an Olefinic Thermoplastic Elastomer (J-1):
    On a Bumbury's mixer, 30 parts by weight of the polyolefin resin (j-11) and 70 parts by weight of the ethylene/α-olefin copolymer rubber (j-21) were kneaded at 180° C. under a nitrogen atmosphere for 5 minutes, followed by passing through a sheeting roll to produce a pelletized product by a sheet cutter. Then, 100 parts by weight of this pelletized product and a solution of 0.3 part by weight of 1,3-bis(tert-butylperoxyisopropyl)benzene dissolved in 0.3 part by weight of divinylbenzene were mixed on a tumbler type blender, in order to coat the pellets with the solution uniformly. Thereafter, the resulting pelletized product was extruded by an extruder at 210° C. under a nitrogen atmosphere to effect the dynamic heat treatment, whereby an olefinic thermoplastic elastomer (J-1) having a gel content of 77% by weight was obtained. 100 parts by weight of the so-obtained olefinic thermoplastic elastomer (J-1) and 5 parts by weight of the olefinic thermoplastic resin (K-1) were extruded by an extruder at 210° C. under a nitrogen atmosphere to produce a pelletized product of an olefinic thermoplastic elastomer composition. From this pelletized product, a cylindrical test specimen having a thickness of 12.7 mm and a diameter of 29.0 mm was produced by injection molding, for which compression set (JIS K 6262, 70° C., 22 hours) was observed, which was determined to be 36%. Also a melt flow rate (JIS K 7120, 230° C., 10 kg load) was observed for this pelletized product which was determined to be 33 g/10 min.

(2) Production of the Laminate

There were blended 100 parts by weight of the olefinic thermoplastic elastomer (J-1), 5 parts by weight of the olefinic thermoplastic resin (K-1) and 1.5 parts by weight of the foaming agent (B-2) on a tumbler type blender to prepare a foamable composition. This foamable composition was extrusion-molded at a die temperature of 150° C. to effect a foaming molding to form a core plate and substrate layer portions, while at the same time the ultrahigh molecular weight polyethylene composition (Y-1) was co-extruded to form a skin layer, whereupon the substrate layer and the skin layer were heat melt-bonded to thereby produce a weather strip as shown in FIG. 1. The substrate layer had a thickness of 2 mm and the skin layer had a thickness of 100 μm. The foaming expansion ratio of the resulting weather strip was 2.2 times the original composition volume.

The so-produced weather strip was assembled on a window frame for testing, whereupon a window glass having a thickness of 3.2 mm was inserted therein, in order to carry out a durability test (repeating test of up-and-down motion of the window glass). The weather strip had withstood 50,000 repetitions of up-and-down motion without suffering from any yielding phenomenon nor abrasion and had maintained its function as weather strip.

Example 2-2

In the same manner as in Example 2-1, an olefinic thermoplastic elastomer (J-2) was obtained using 30 parts by weight of the polyolefin resin (j-11), 70 parts by weight of the ethylene/α-olefin copolymer rubber (j-21) and 50 parts by weight of the softening agent (j-31). This olefinic thermoplastic elastomer (J-2) had a gel content of 71% by weight. Using the olefinic thermoplastic elastomer (J-2) and the olefinic thermoplastic resin (K-1), compression set and MFR were observed in the same way as in Example 2-1, whereby a compression set of 35% and an MFR of 37 g/10 min. were determined.

Then, using the olefinic thermoplastic elastomer (J-2), an olefinic foamable composition was prepared in the same way as in Example 2-1. Thereafter, a weather strip was produced together with the skin layer same as that of Example 2-1, for which a durability test was carried out. The test showed that this weather strip had withstood the 50,000 repetition test and maintained its function as weather strip. The foaming expansion ratio of the resulting weather strip was found to be 2.3 times the original composition volume.

Example 2-3

In the same manner as in Example 2-1, except that 120 parts by weight of the oil-extended ethylene α-olefin copolymer rubber (j-22) were used instead of using 70 parts by weight of the ethylene/α-olefin copolymer rubber (j-21), an olefinic thermoplastic elastomer (J-3) was obtained. This olefinic thermoplastic elastomer (J-3) had a gel content of 73% by weight. Using the olefinic thermoplastic elastomer (J-3) and the olefinic thermoplastic resin (K-1), the procedures same as in Example 2-1 were pursued to determine the compression set and the MFR. The compression set and the MFR were found to be 35% and 37 g/10 min., respectively.

Then, using the olefinic thermoplastic elastomer (J-3), an olefinic foamable composition was prepared in the same way as in Example 2-1. Thereafter, a weather strip was produced using together the skin layer same as that of Example 2-1, for which the durability test was carried out. The test showed that this weather strip had withstood the 50,000 repetition test and maintained its function as weather strip. The foaming expansion ratio of the resulting weather strip was found to be 2.3 times the original composition volume.

Example 2-4

Using 30 parts by weight of the polyolefin resin (j-11), 70 parts by weight of an ethylene/α-olefin copolymer rubber (j-21), 50 parts by weight of the softening agent (j-31) and 30 parts by weight of a butyl rubber (having an unsaturation degree of 0.5% and an Mooney viscosity [$ML_{1+4}(100°$ C.)] of 40), an olefinic thermoplastic elastomer (J-4) was obtained in the same procedures as in Example 2-1. This olefinic thermoplastic elastomer (J-4) had a gel content of 81% by weight. Using the olefinic thermoplastic elastomer (J-4) and the olefinic thermoplastic resin (K-1), the procedures same as in Example 2-1 were pursued to determine the compression set and the MFR. The compression set and the MFR were found to be 33% and 42 g/10 min., respectively.

Then, using the olefinic thermoplastic elastomer (J-4), an olefinic foamable composition was prepared in the same way as in Example 2-1. Thereafter, a weather strip was produced using together the skin layer same as that of Example 2-1, for which the durability test was carried out. The test showed that this weather strip had withstood the 50,000 repetition test and maintained its function as weather strip. The foaming expansion ratio of the resulting weather strip was found to be 2.6 times the original composition volume.

Example 2-5

(1) Production of an Olefinic Thermoplastic Elastomer (C-2):

On a Bumbury's mixer, 60 parts by weight of the rubber (c-11) and 40 parts by weight of the crystalline polyolefin resin (c-21) (having a degree of crystallinity=72% determined by X-ray diffraction) were kneaded at 180° C. under a nitrogen atmosphere for 5 minutes, followed by passing through a sheeting roll to produce dice-formed pellets by a sheet cutter. Then, the dice-formed pellets were mixed with 0.2 part by weight of 1,3-bis(tert-butylperoxyisopropyl)benzene and 0.2 part by weight of divinylbenzene on a Henschell mixer. Thereafter, the resulting pelletized product was extruded at 210° C. by a double shaft extruder having an L/D value of 40 and a screw diameter of 50 mm under a nitrogen atmosphere, whereby an olefinic thermoplastic elastomer (C-2) was obtained. The resulting olefinic thermoplastic elastomer (C-2) had a gel content of 78% by weight, as determined by the method given previously.

(2) Production of the Laminate

There were kneaded 100 parts by weight of the olefinic thermoplastic elastomer (C-2) and 2 parts by weight of the organopolysiloxane (D-1) on a double shaft extruder to prepare an olefinic thermoplastic elastomer composition (Z2-1) for the skin layer.

This olefinic thermoplastic elastomer composition (Z2-1) was molded under co-extrusion together with the olefinic foamable composition same as that of Example 2-1 to produce a weather strip, for which the durability test was carried out. The weather strip had withstood the 50,000 repetition test and had maintained its function as weather strip.

Example 2-6

On a double shaft extruder, 100 parts by weight of the olefinic thermoplastic elastomer (C-2) obtained in Example 2-5, 2 parts by weight of the organopolysiloxane (D-1) and 14 parts by weight of the organopolysiloxane (D-2) were kneaded, whereby an olefinic thermoplastic elastomer composition (Z2-2) for the skin layer was obtained.

This olefinic thermoplastic elastomer composition (Z2-2) was molded under co-extrusion together with the olefinic foamable composition same as that of Example 2-1 to produce a weather strip, for which the durability test was carried out. The weather strip had withstood the 50,000 repetition test and had maintained its function as weather strip.

Example 2-7

On a double shaft extruder, 100 parts by weight of the olefinic thermoplastic elastomer (C-2) obtained in Example 2-5 and 3 parts by weight of the fluorine-containing polymer (E-1) were kneaded, whereby an olefinic thermoplastic elastomer composition (Z2-3) for the skin layer was obtained.

This olefinic thermoplastic elastomer composition (Z2-3) was molded under co-extrusion together with the olefinic foamable composition same as that of Example 2-1 to produce a weather strip, for which the durability test was carried out. The weather strip had withstood the 50,000 repetition test and had maintained its function as weather strip.

Example 2-8

On a double shaft extruder, 100 parts by weight of the olefinic thermoplastic elastomer (C-2) obtained in Example 2-5 and 3 parts by weight of the antistatic agent (F-1) were kneaded, whereby an olefinic thermoplastic elastomer composition (Z2-4) for the skin layer was obtained.

This olefinic thermoplastic elastomer composition (Z2-4) was molded under co-extrusion together with the olefinic foamable composition same as that of Example 2-1 to produce a weather strip, for which the durability test was carried out. The weather strip had withstood the 50,000 repetition test and had maintained its function as weather strip.

Example 2-9

On a double shaft extruder, 100 parts by weight of the olefinic thermoplastic elastomer (C-2) obtained in Example 2-5 and 10 parts by weight of the ultrahigh molecular weight polyolefin composition (Y-1) were kneaded, whereby an olefinic thermoplastic elastomer composition (Z2-5) for the skin layer was obtained.

This olefinic thermoplastic elastomer composition (Z2-5) was molded under co-extrusion together with the olefinic foamable composition same as that of Example 2-1 to produce a weather strip, for which the durability test was carried out. The weather strip had withstood the 50,000 repetition test and had maintained its function as weather strip.

Example 2-10

On a double shaft extruder, 100 parts by weight of the olefinic thermoplastic elastomer (C-2) obtained in Example 2-5, 100 parts by weight of the ultrahigh molecular weight polyolefin composition (Y-1) and 2 parts by weight of the organopolysiloxane (D-1) were kneaded, whereby an olefinic thermoplastic elastomer composition (Z2-6) for the skin layer was obtained.

This olefinic thermoplastic elastomer composition (Z2-6) was molded under co-extrusion together with the olefinic foamable composition same as that of Example 2-1 to produce a weather strip, for which the durability test was carried out. The weather strip had withstood the 50,000 repetition test and had maintained its function as weather strip.

Example 2-11

On a double shaft extruder, 100 parts by weight of the olefinic thermoplastic elastomer (C-2) obtained in Example 2-5, 2 parts by weight of the organopolysiloxane (D-1) and 30 parts by weight of the polyolefin resin (G-2) were kneaded, whereby an olefinic thermoplastic elastomer composition (Z2-7) for the skin layer was obtained.

This olefinic thermoplastic elastomer composition (Z2-7) was molded under co-extrusion together with the olefinic foamable composition same as that of Example 2-1 to produce a weather strip, for which the durability test was carried out. The weather strip had withstood the 50,000 repetition test and had maintained its function as weather strip.

Comparative Example 2-1

Using a conventional weather strip (having a laminate structure in which a nylon film is attached onto a layer of a soft vinyl chloride resin), the durability test was carried out in the same way as in Example 2-1. In this test, a breakdown occurred on the face contacting with the window glass after 25,000 repetitions, whereby the friction resistance on the window glass increased considerably to thereby render practical use impossible.

Example 3-1

Figure 2:
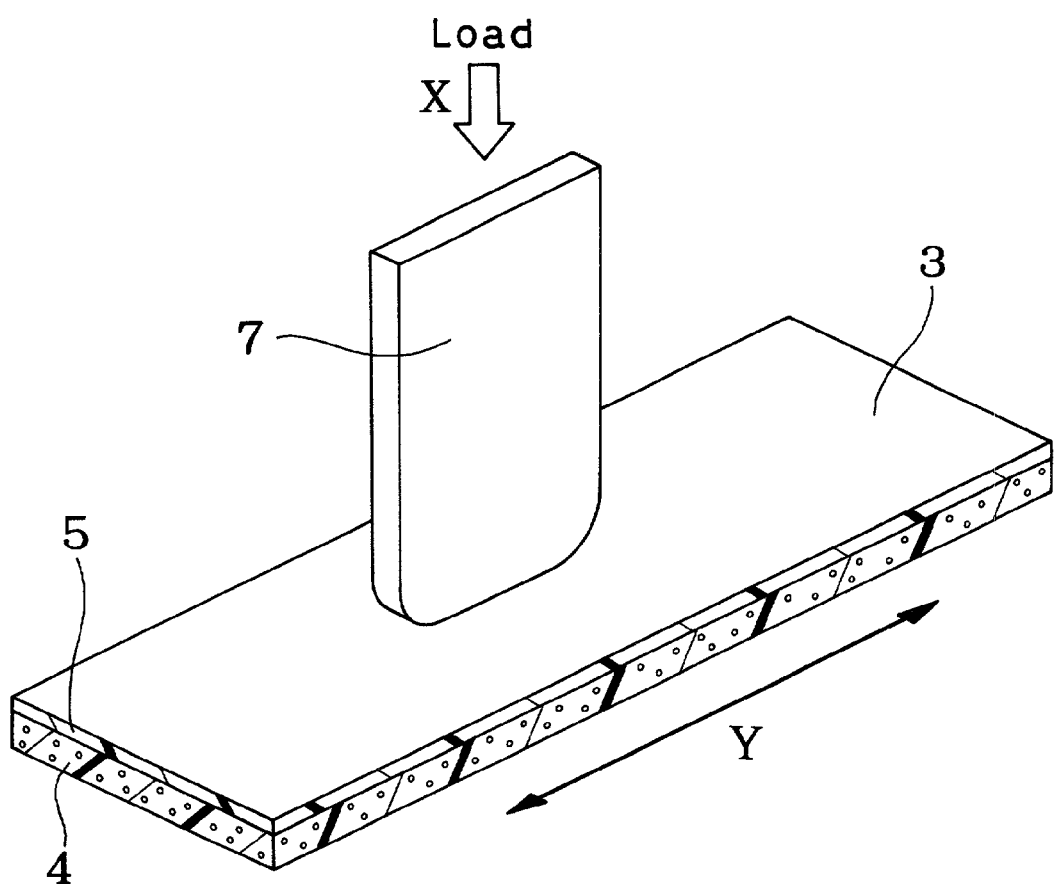
FIG. 2 indicates the practical manner of the muddy slurry friction test performed in the specific Examples in a perspective schematic illustration.

A test specimen was prepared by cutting the contact seal lug 3 out of the weather strip of Example 2-11 (See FIG. 1). Onto the skin layer 5, a glass friction piece 7 (20 mm width, 30 mm height, 4.5 mm thickness) was caused to contact as shown in FIG. 2. On a sliding abrasion tester, a muddy slurry friction test was carried out in such a manner that the contact seal lug 3 was moved to go and return along the direction of the arrow Y over a stroke of 100 mm while imposing on the glass friction piece 7 a load of 3 kg towards the direction indicated by the arrow X. Here, a muddy slurry (water/sand=3/1) was dripped onto the contact region at the initial stage and at an interval of 1,000 repeats of the reciprocating movement using a 0.5 ml syringe. The state of wearing was assessed after 5,000 repeats of the reciprocal movement. The results are recited in Table 2.

Comparative Examples 3-1 to 3-3

The muddy slurry friction test same as that of Example 3-1 was carried out except that a test specimen made of a non-foamed laminate prepared by laminating a layer of the olefinic thermoplastic elastomer (J-1) for the substrate layer of Example 2-1 on a layer of the olefinic thermoplastic elastomer composition (Z2-7) for the skin layer of Example 2-11 (in Comparative Example 3-1), a test specimen made of single layer of the foamed substrate layer of Example 2-1 (in Comparative Example 3-2) or a test specimen made of a single layer of the olefinic thermoplastic elastomer composition (Z2-7) for the skin layer of Example 2-11 (in Comparative Example 3-3) was employed in the place of the test specimen used in Example 3-1. The results are recited in Table 2.

TABLE 2

|  | Assessment rank*) |
| --- | --- |
| Example 3-1 | 5 |
| Comp. Example 3-1 | 3 |
| Comp. Example 3-2 | 1 |
| Comp. Example 3-3 | 5 |

Note*):
Assessment rank 5: almost no wear found
Assessment rank 4: intermediate between rank 5 and rank 3
Assessment rank 3: partial wear found
Assessment rank 2: intermediate between rank 3 and rank 1
Assessment rank 1: considerable wear found Example 3-2

The flexibility of the foamed laminate according to the present invention was examined. Thus, the weather strip of Example 2-11 was used as the test specimen and hand touch upon impressing onto this specimen was examined as to whether a spongy touch was obtained or not. The results are recited in Table 3.

Comparative Examples 3-4 to 3-6

The test was carried out in the same manner as in Example 3-2, except that a test specimen made of a non-foamed laminate prepared by laminating a layer of the olefinic thermoplastic elastomer (J-1) for the substrate layer of Example 2-1 on a layer of the olefinic thermoplastic elastomer composition (Z2-7) for the skin layer of Example 2-11 (in Comparative Example 3-4), a test specimen made of single layer of the foamed substrate layer of Example 2-1 (in Comparative Example 3-5) or a test specimen made of a single layer of the olefinic thermoplastic elastomer composition (Z2-7) for the skin layer of Example 2-11 (in Comparative Example 3-6) was employed in the place of the test specimen used in Example 3-2. The results are recited in Table 3.

TABLE 3

|  | Assessment rank*) |
| --- | --- |
| Example 3-2 | 5 |
| Comp. Example 3-4 | 2 |
| Comp. Example 3-5 | 5 |
| Comp. Example 3-6 | 1 |

Note*):
Assessment rank 5: spongy hand touch
Assessment rank 4: softness reduced some
Assessment rank 3: softness reduced more
Assessment rank 2: some solid touch
Assessment rank 1: solid hand touch

INDUSTRIAL APPLICABILITY

The foamed laminate based on olefin according to the present invention is made at a high foaming expansion ratio with soft hand touch and, in addition, is superior in the appearance, abrasion resistance, durability and sliding performance, so that it can be used favorably, for example, for sliding parts, weather strips for automotive and architectural seal elements.

The invention claimed is:

1. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein said substrate layer comprises a foamed body ($X_{F1}$) comprising an uncrosslinked ethylenic thermoplastic elastomer (A) comprising 5-60 parts by weight of a polyethylene resin (a-1) and 40-95 parts by weight of a copolymer based on ethylene/α-olefin (a-2), with said constituents (a-1) and (a-2) summing up to 100 parts by weight, and said skin layer comprises an ultrahigh molecular weight polyolefin resin (Y), wherein said ethylenic, thermoplastic elastomer (A) consists of a thermoplastic elastomer obtained by subjecting a mixture of the polyethylene resin (a-1) and the copolymer based on ethylene/α-olefin (a-2) to a dynamic heat treatment in the absence of a cross-linking agent, and wherein said copolymer based on ethylene/α-olefin (a-2) is a copolymer of ethylene, an α-olefin and, optionally incorporated, non-conjugated polyene and has a Mooney viscosity $ML_{1+4}$ (100° C.) of 90-250 and an ethylene content of 70-95 mole %, and wherein the ethylenic thermoplastic elastomer (A) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F1}$) is formed by subjecting a foamable ethylenic thermoplastic elastomer composition ($X_1$) comprising the ethylenic thermoplastic elastomer (A) and 0.5-20 parts by weight of an organic or inorganic foaming agent of a heat decomposition type (B) per 100 parts by weight of the ethylenic thermoplastic elastomer (A) and the foaming agent (B) to foaming by co-extrusion with the foaming expansion ratio of the foamed body ($X_{F1}$) of at least twofold, and wherein the foamed laminate is formed by co-extrusion of the foamable ethylenic thermoplastic elastomer composition ($X_1$) and the ultrahigh molecular weight polyolefin resin (Y) wherein the foamable ethylenic thermoplastic elastomer composition ($X_1$) foams by heat fusing to form the substrate layer of the foamed body ($X_{F1}$), and wherein said ultrahigh molecular weight polyolefin resin (Y) is one which has an intrinsic viscosity ($\eta$) of 3.5-8.3 dl/g as determined in decalin at 135° C.

2. The foamed laminate based on olefin as claimed in claim 1, wherein the ultrahigh molecular weight polyolefin resin (Y) comprises 15-40 parts by weight of an ultrahigh molecular weight polyolefin resin (y1) having an intrinsic viscosity ($\eta$) of 10-40 dl/g as determined in decalin at 135° C. and 85-60 parts by weight of a polyolefin resin (y2) having an intrinsic viscosity ($\eta$) of 0.1-5 dl/g as determined in decalin at 135° C., with said constituents (y-1) and (y-2) summing up to 100 parts by weight.

3. The foamed laminate based on olefin as claimed in claim 1, wherein the ethylenic thermoplastic elastomer (A) comprises a polypropylene resin (a-3) in an amount of 30 parts by weight or less, per 100 parts by weight of total sum of the polyethylene resin (a-1) and the copolymer based on ethylene/α-olefin (a-2).

4. A sliding element comprising the foamed laminate based on olefin as claimed in claim 1.

5. A weather strip for automobile comprising the foamed laminate based on olefin as claimed in claim 1.

6. A sealing material for architectural use comprising the foamed laminated based on olefin as claimed in claim 1.

7. A process for producing a foamed laminate as claimed in claim 1, said process comprising
the steps of
providing starting resin composition for the substrate layer comprising the uncrosslinked ethylenic thermoplastic elastomer (A) and the foaming agent (B) as claimed in claim 1,
providing the resin for skin layer of claim 1,
co-extruding the resin composition for the substrate layer together with the resin for the skin layer by using a multilayer extrusion molding machine, and heat fusing these layers to thereby cause the substrate layer to foam up.

8. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein
said substrate layer comprises a foamed body ($X_{F1}$) comprising an uncrosslinked ethylenic thermoplastic elastomer (A) comprising 5-60 parts by weight of a polyethylene resin (a-1) and 40-95 parts by weight of a copolymer based on ethylene/α-olefin (a-2), with said constituents (a-1) and (a-2) summing up to 100 parts by weight, and
said skin layer comprises an olefinic thermoplastic elastomer composition ($Z_1$),
wherein said ethylenic thermoplastic elastomer (A) consists of a thermoplastic elastomer obtained by subjecting a mixture of the polyethylene resin (a-$_1$) and the copolymer based on ethylene/α-olefin (a-2) to a dynamic heat treatment in the absence of a cross-linking agent, and
wherein said copolymer based on ethylene/α-olefin (a-2) is a copolymer of ethylene, an α-olefin and, optionally incorporated, non-conjugated polyene and has a Mooney viscosity $ML_{1+4}$ (100° C.) of 90-250 and an ethylene content of 70-95 mole %, and
wherein the ethylenic thermoplastic elastomer (A) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F1}$) is formed by subjecting a foamable ethylenic thermoplastic elastomer composition ($X_1$) comprising the ethylenic thermoplastic elastomer (A) and 0.5-20 parts by weight of an organic or inorganic foaming agent of a heat decomposition type (B) per 100 parts by weight of the ethylenic thermoplastic elastomer (A) and the foaming agent (B) to foaming by co-extrusion with the foaming expansion ratio of the foamed body ($X_{F1}$) of at least twofold and wherein the foamed laminate is formed by co-extrusion of the foamable ethylenic thermoplastic elastomer composition ($X_1$) and the skin layer comprises an olefinic thermoplastic elastomer composition ($Z_1$) wherein the foamable ethylenic thermoplastic elastomer composition ($X_1$) foams by heat fusing to form the substrate layer of the foamed body ($X_{F1}$), and wherein said olefinic thermoplastic elastomer composition ($Z_1$) is one which comprises, per 100 parts by weight of an olefinic thermoplastic elastomer (C), at least one kind of lubricant selected from the group consisting of 0.5-25 parts by weight of an organopolysiloxane (D), 0.5-10 parts by weight of a fluorine-containing polymer (E) and 0.5-10 parts by weight of an antistatic agent (F), each in a proportion as given above.

9. A process for producing a foamed laminate as claimed in claim 8, said process comprising the steps of
providing starting resin composition for the substrate layer comprising the uncrosslinked ethylenic thermoplastic elastomer (A) and the foaming agent (B) as claimed in claim 8,
providing the resin for the skin layer of claim 8,
co-extruding the resin composition for the substrate layer together with the resin for the skin layer by using multilayer extrusion molding machine, and
heat fusing these layers to thereby cause the substrate layer to foam up.

10. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein
said substrate layer comprises a foamed body ($X_{F1}$) comprising an uncrosslinked ethylenic thermoplastic elastomer (A) comprising 5-60 parts by weight of a polyethylene resin (a-1) and 40-95 parts by weight of a copolymer based on ethylene/α-olefin (a-2), with said constituents (a-1) and (a-2) summing up to 100 parts by weight, and
said skin layer comprises an olefinic thermoplastic elastomer composition ($Z_2$),
wherein said ethylenic thermoplastic elastomer (A) consists of a thermoplastic elastomer obtained by subjecting a mixture of the polyethylene resin (a-1) and the copolymer based on ethylene/α-olefin (a-2) to a dynamic heat treatment in the absence of a cross-linking agent, and
wherein said copolymer based on ethylene/α-olefin (a-2) is a copolymer of ethylene, an α-olefin and, optionally incorporated, non-conjugated polyene and has a Mooney viscosity $ML_{1+4}$(100° C.) of 90-250 and an ethylene content of 70-95 mole %, and
wherein the ethylenic thermoplastic elastomer (A) is one which has a compression set of 60% or less as determined according to JIS K 6262 (at 70° C., 22 hours)

and a melt flow rate of 0.1 g/10 min. or higher as determined according to JIS K 7120 (at 230° C., 10 kg load), and wherein the foamed body ($X_{F1}$) is formed by subjecting a foamable ethylenic thermoplastic elastomer composition ($X_1$) comprising the ethylenic thermoplastic elastomer (A) and 0.5-20 parts by weight of an organic or inorganic foaming agent of a heat decomposition type (B) per 100 parts by weight of the ethylenic thermoplastic elastomer (A) and the foaming agent (B) to foaming by co-extrusion with the foaming expansion ratio of the foamed body ($X_{F1}$) of at least twofold and wherein the foamed laminate is formed by co-extrusion of the foamable ethylenic thermoplastic elastomer composition ($X_1$) and the skin layer comprises an olefinic thermoplastic elastomer composition ($Z_2$) wherein the foamable ethylenic thermoplastic elastomer composition ($X_1$) foams by heat fusing to form the substrate layer of the foamed body ($X_{F1}$), and wherein the said olefinic thermoplastic elastomer composition (Z2) is one which comprises, per 100 parts by weight of an olefinic thermoplastic elastomer (C), a polyolefin resin (G) in an amount of 5-200 parts by weight.

11. A process for producing a foamed laminate as claimed in claim 10, said process comprising the steps of
providing starting resin composition for the substrate layer comprising the uncrosslinked ethylenic thermoplastic elastomer (A) and the foaming agent (B) as claimed in claim 10,
providing the resin for the skin layer of claim 10,
co-extruding the resin composition for the substrate layer togetherwith the resin for the skin layer by using multilayer extrusion molding machine, and
heat fusing these layers to thereby cause the substrate layer to foam up.

12. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein
said substrate layer comprises a foamed body ($X_{F1}$) comprising an uncrosslinked ethylenic thermoplastic elastomer (A) comprising 5-60 parts by weight of a polyethylene resin (a-1) and 40-95 parts by weight of a copolymer based on ethylene/α-olefin (a-2), with said constituents (a-1) and (a-2) summing up to 100 parts by weight, and
said skin layer comprises an olefinic thermoplastic elastomer composition ($Z_3$),
wherein said ethylenic thermoplastic elastomer (A) consists of a thermoplastic elastomer obtained by subjecting a mixture of the polyethylene resin (a-1) and the copolymer based on ethylene/α-olefin (a-2) to a dynamic heat treatment in the absence of a cross-linking agent, and
wherein said copolymer based on ethylene/α-olefin (a-2) is a copolymer of ethylene, an α-olefin and, optionally incorporated, non-conjugated polyene and has a Mooney viscosity $ML_{1+4}$(100° C.) of 90-250 and an ethylene content of 70-95 mole %, and
wherein the ethylenic thermoplastic elastomer (A) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F1}$) is formed by subjecting a foamable ethylenic thermoplastic elastomer composition ($X_1$) comprising the ethylenic thermoplastic elastomer (A) and 0.5-20 parts by weight of an organic or inorganic foaming agent of a heat decomposition type (B) per 100 parts by weight of the ethylenic thermoplastic elastomer (A) and the foaming agent (B) to foaming by co-extrusion with the foaming expansion ratio of the foamed body ($X_{F1}$) of at least twofold and wherein the foamed laminate is formed by co-extrusion of the foamable ethylenic thermoplastic elastomer composition ($X_1$) and the olefinic thermoplastic elastomer composition ($Z_3$) wherein the foamable ethylenic thermoplastic elastomer composition ($X_1$) foams by heat fusing to form the substrate layer of the foamed body ($X_{F1}$), and wherein said olefinic thermoplastic elastomer composition ($Z_3$) is one which comprises, per 100 parts by weight of an olefinic thermoplastic elastomer (C), at least one kind selected from the group consisting of 0.5-25 parts by weight of an organopolysiloxane (D), 0.5-10 parts by weight of a fluorine-containing polymer (E), 0.5-10 parts by weight of an antistatic agent (F), 0.01-5 parts by weight of a fatty acid amide, 0.01-5 parts by weight of a metal soap, 0.01-5 parts by weight of an ester, 0.01-5 parts by weight of calcium carbonate and 0.01-5 parts by weight of a silicate, each in a proportion given above, and which further comprises a polyolefin resin (G) in an amount of 5-200 parts by weight.

13. A process for producing a foamed laminate as claimed in claim 12, said process comprising the steps of
providing starting resin composition for the substrate layer comprising the uncrosslinked ethylenic thermoplastic elastomer (A) and the foaming agent (B) as claimed in claim 12,
providing the resin for the skin layer of claim 12,
co-extruding the resin composition for the substrate layer together with the resin for the skin layer by using a multilayer extrusion molding machine, and
heat fusing these layers to thereby cause the substrate layer to foam up.

14. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein
said substrate layer comprises a foamed body ($X_{F1}$) comprising an uncrosslinked ethylenic thermoplastic elastomer (A) comprising 5-60 parts by weight of a polyethylene resin (a-1) and 40-95 parts by weight of a copolymer based on ethylene/α-olefin (a-2), with said constituents (a-1) and (a-2) summing up to 100 parts by weight, and
said skin layer comprises an olefinic thermoplastic elastomer composition (Z),
wherein said ethylenic thermoplastic elastomer (A) consists of a thermoplastic elastomer obtained by subjecting a mixture of the polyethylene resin (a-1) and the copolymer based on ethylene/α-olefin (a-2) to a dynamic heat treatment in the absence of a cross-linking agent, and
wherein said copolymer based on ethylene/α-olefin (a-2) is a copolymer of ethylene, an α-olefin and, optionally incorporated, non-conjugated polyene and has a Mooney viscosity $ML_{1+4}$(100° C.) of 90-250 and an ethylene content of 70-95 mole %, and wherein the ethylenic thermoplastic elastomer (A) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F1}$) is formed by subjecting a foamable ethylenic thermoplastic elastomer composition ($X_1$) comprising the ethylenic thermoplastic elastomer (A) and 0.5-20 parts by weight of an organic or inorganic foaming agent of a heat decomposition type (B) per 100 parts by weight of the ethylenic thermoplastic elastomer (A) and the foaming agent (B) to foaming by co-extrusion with the foaming expansion ratio of the foamed body ($X_{F1}$) of at least twofold and wherein the foamed laminate is formed by co-extrusion of the foamable ethylenic thermoplastic elastomer composition ($X_1$) and the olefinic thermoplastic elastomer composition (Z) wherein the foamable ethylenic thermoplastic elastomer composition ($X_1$) foams by heat fusing to form the substrate layer of the foamed body ($X_{F1}$), and wherein said olefinic thermoplastic elastomer composition (Z) is one which comprises, per 100 parts by weight of an olefinic thermoplastic elastomer (C), at least one kind of lubricant ($Z_L$) selected from the group consisting of 0.5-25 parts by weight of an organopolysiloxane (D), 0.5-10 parts by weight of a fluorine-containing polymer (E), 0.5-10 parts by weight of an antistatic agent (F), 5-200 parts by weight of a polyolefin resin (G), 0.01-5 parts by weight of a fatty acid amide, 0.01-5 parts by weight of a metal soap, 0.01-5 parts by weight of an ester, 0.01-5 parts by weight of calcium carbonate and 0.01-5 parts by weight of a silicate, each in a proportion as given above.

15. The foamed laminate based on olefin as claimed in any one of claims 14 to 12, wherein the olefinic thermoplastic elastomer (C) is one which is obtained by a dynamic heat treatment of a mixture comprising a crystalline polyolefin resin (c-1) and a rubber (c-2).

16. The foamed laminate based on olefin as claimed in claim 14, 10, or 12, wherein the polyolefin resin (G) is an ultrahigh molecular weight polyolefin resin (Y).

17. The foamed laminate based on olefin as claimed in claim 14, wherein the olefinic thermoplastic elastomer (C) is one which is obtained by subjecting a mixture comprising the crystalline polyolefin resin (c-1) and the rubber (c-2) to a dynamic heat treatment in the presence of a cross-linking agent.

18. A process for producing a foamed laminate as claimed in claim 14, said process comprising the steps of providing starting resin composition for the substrate layer comprisin the uncrosslinked ethylenic thermoplastic elastomer (A) and the foaming agent (B) as claimed in claim 14, providing the resin for the skin later of claim 14, co-extruding the resin composition for the substrate layer together with the resin for the skin layer by using a multilayer extrusion molding machine, and heat fusing these layers to thereby cause the substrate layer to foam up.

19. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein said substrate layer comprises a foamed body ($X_{F2}$) comprising an uncrosslinked olefinic thermoplastic elastomer composition ($X_2$) comprising 100 parts by weight of an olefinic thermoplastic elastomer (J) and 1-20 parts by weight of an olefinic thermoplastic resin (K), said skin layer comprises an ultrahigh molecular weight polyolefin resin (Y), and optionally at least one of a softening agent, heat-resisting stabilizer, antistatic agent, weathering stabilizer, antioxidant, filler, coloring agent or a lubricant, wherein said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with said constituents (j-1) and (j-2) summing up to 100 parts by weight, to a dynamic heat treatment, said ethylene/α-olefin copolymer rubber (j-2) is one which has a Mooney viscosity $ML_{1+4}$ (100° C.) of 10-250 and an ethylene content of 55-95 mole % and said olefinic thermoplastic resin (K) is one which has an olefin content of 50-100 mole % and a melt flow rate (ASTM D-1238-65T, 230° C., 2.16 kg load) of 0.01-2 g/10 min. and said ultrahigh molecular weight polyolefin resin (Y) is one which has an intrinsic viscosity ($\eta$) of 3.5 -8.3 dl/g determined in decalin at 135° C., and wherein the olefinic thermoplastic elastomer composition ($X_2$) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F2}$) is formed by foaming a foamable composition based on olefin ($X_3$) comprising 100 parts by weight of the olefinic thermoplastic elastomer (J), 1-20 parts by weight of the olefinic thermoplastic resin (K) and 0.5-20 parts by weight of an organic or an inorganic foaming agent of heat-decomposition type (B) per 100 parts by weight of total sum of the olefinic thermoplastic elastomer (J) and the olefinic thermoplastic resin (K) by co-extrusion with the foaming expansion ratio of the foamed body ($X_{F2}$) of at least twofold, and wherein the foamed laminate is formed by co-extrusion of the foamable composition based on olefin ($X_3$) and the ultrahigh molecular weight polyolefin resin (Y) wherein the foamable composition based on olefin ($X_3$) foams by heat fusing to form the substrate layer of the foamed body ($X_{F2}$).

20. The formed laminate based on olefin, as claimed in claim 19, wherein the ultrahigh molecular weight polyolefin resin (Y) comprises 15-40 parts by weight of an ultrahigh molecular weight polyolefin resin (y-1) having an intrinsic viscosity ($\eta$) of 10 -40 dl/g as determined in decalin at 135° C. and 85-60 parts by weight of a polyolefin resin (y-2) having an intrinsic viscosity ($\eta$) of 0.1-5 dl/g as determined in decalin at 135° C., with said constituents (y-1) and (y-2) summing up to 100 parts by weight.

21. The foamed laminate based on olefin, as claimed in claim 19, wherein the polyolefin resin (j-1) of the olefinic thermoplastic elastomer (J) is a polypropylene resin.

22. The foamed laminate based on olefin, as claimed in claim 19, wherein the olefinic thermoplastic elastomer (J) comprises further 10-200 parts by weight of a softening agent (j-3) per 100 parts by weight of the ethylene/αolefin copolymer rubber (j-2).

23. The foamed laminate based on olefin, as claimed in claim 19, wherein the olefinic thermoplastic elastomer (J) is a thermoplastic elastomer composition obtained by subjecting a mixture comprising the polyolefin resin (j-1) and the ethylene/α-olefin copolymer rubber (j2) or a mixture which comprises further, optionally incorporated, the softening agent (j3) to a dynamic heat treatment in the presence of a crosslinking agent.

24. The foamed laminate based on olefin, as claimed in claim 19, wherein the olefinic thermoplastic resin (K) is an isotactic polypropylene, or a propylene/α-olefin copolymer.

25. The foamed laminate based on olefin, as claimed in claim 19, wherein the olefinic thermoplastic elastomer (j) is a thermoplastic elastomer composition obtained by subjecting a mixture comprising the polyolefin resin (j-1) and the ethylene/α-olefin copolymer rubber (j2) or a mixture which comprises further, optionally incorporated, the softening agent (j-3) to a dynamic heat treatment in the presence of a crosslinking agent, wherein the polyolefin resin (j-1) is a polypropylene resin, and wherein the softening agent (j-3) is in a concentration of 10-200 parts by weight per 100 parts by weight of the ethylene/αolefin copolymer rubber (j-2).

26. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein said substrate layer comprises a foamed body ($X_{F2}$) comprising an uncrosslinked olefinic thermoplastic elastomer composition ($X_{F2}$) comprising 100 parts by weight of an olefinic thermoplastic elastomer (J) and 1-20 parts by weight of an olefinic thermoplastic resin (K), and said skin layer comprises an olefinic thermoplastic elastomer composition ($Z_1$), wherein said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with said constituents (j-1) and (j-2) summing up to 100 parts by weight, to a dynamic heat treatment, said ethylene/α-olefin copolymer rubber (j-2) is one which has a Mooney viscosity $ML_{1+4}$ (100° C.) of 10-250 and an ethylene content of 55-95 mole % and said olefinic thermoplastic resin (K) is one which has an olefin content of 50-100 mole % and a melt flow rate (ASTM D-1238-65T, 230° C., 2.16 kg load) of 0.01-2 g/10 min., and wherein the olefinic thermoplastic elastomer composition ($X_2$) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F2}$) is formed by foaming a foamable composition based on olefin ($X_3$) comprising 100 parts by weight of the olefinic thermoplastic elastomer (J), 1-20 parts by weight of the olefinic thermoplastic resin (K) and 0.5-20 parts by weight of an organic or an inorganic foaming agent of heat-decomposition type (B) per 100 parts by weight of total sum of the olefinic thermoplastic elastomer (J) and the olefinic thermoplastic resin (K) by co-extrusion with the foaming expansion ratio of the foamed body ($X_{F2}$) of at least twofold, and wherein the foamed laminate is formed by co-extrusion of the foamable composition based on olefin ($X_3$) and the olefinic thermoplastic elastomer composition ($Z_1$) wherein the foamable composition based on olefin ($X_3$) foams by heat fusing to form the substrate layer of the foamed body ($X_{F2}$), and said olefinic thermoplastic elastomer composition (Z1) is one which comprises, per 100 parts by weight of an olefinic thermoplastic elastomer (C), at least one kind of lubricant selected from the group consisting of 0.5-25 parts by weight of an organopolysiloxane (D), 0.5-10 parts by weight of a fluorine-containing polymer (E) and 0.5-10 parts by weight of an antistatic agent (F), each in a proportion as given above.

27. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein said substrate layer comprises a foamed body ($X_{F2}$) comprising an uncrosslinked olefinic thermoplastic elastomer composition ($X_2$) comprising 100 parts by weight of an olefinic thermoplastic elastomer (J) and 1-20 parts by weight of an olefinic thermoplastic resin (K), and said skin layer comprises an olefinic thermoplastic elastomer composition ($Z_2$), wherein said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with said constituents (j-1) and (j-2) summing up to 100 parts by weight, to a dynamic heat treatment, said ethylene/α-olefin copolymer rubber (j-2) is one which has a Mooney viscosity $ML_{1+4}$ (100° C.) of 10-250 and an ethylene content of 55-95 mole % and said olefinic thermoplastic resin (K) is one which has an olefin content of 50-100 mole % and a melt flow rate (ASTM D-1238-65T, 230° C., 2.16 kg load) of 0.01-2 g/10 min., and wherein the olefinic thermoplastic elastomer composition ($X_2$) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F2}$) is formed by foaming a foamable composition based on olefin ($X_3$) comprising 100 parts by weight of the olefinic thermoplastic elastomer (J), 1-20 parts by weight of the olefinic thermoplastic resin (K) and 0.5-20 parts by weight of an organic or an inorganic foaming agent of heat-decomposition type (B) per 100 parts by weight of total sum of the olefinic thermoplastic elastomer (J) and the olefinic thermoplastic resin (K) by co-extrusion with the foaming expansion ratio of the foamed body ($X_{F2}$) of at least twofold, and wherein the foamed laminate is formed by co-extrusion of the foamable composition based on olefin ($X_3$) and the olefinic thermoplastic elastomer composition ($Z_2$)

wherein the foamable composition based on olefin ($X_3$) foams by heat fusing to form the substrate layer of the foamed body ($X_{F2}$), and said olefinic thermoplastic elastomer composition ($Z_2$) is one which comprises, per 100 parts by weight of an olefinic thermoplastic elastomer (C), a polyolefin resin (G) in an amount of 5-200 parts by weight.

28. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein said substrate layer comprises a foamed body ($X_{F2}$) comprising an uncrosslinked olefinic thermoplastic elastomer composition ($X_2$) comprising 100 parts by weight of an olefinic thermoplastic elastomer (J) and 1-20 parts by weight of an olefinic thermoplastic resin (K), and said skin layer comprises an olefinic thermoplastic elastomer composition ($Z_3$), wherein said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with said constituents (j-1) and (j-2) summing up to 100 parts by weight, to a dynamic heat treatment, said ethylene/α-olefin copolymer rubber (j-2) is one which has a Mooney viscosity $ML_{1+4}$ (100°C.) of 10-250 and an ethylene content of 55-95 mole % and said olefinic thermoplastic resin (K) is one which has an olefin content of 50-100 mole % and a melt flow rate (ASTM D-1238-65T, 230° C., 2.16 kg load) of 0.01-2 g/10 min., and wherein the olefinic thermoplastic elastomer composition ($X_2$) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F2}$) is formed by foaming a foamable composition based on olefin ($X_3$) comprising 100 parts by weight of the olefinic thermoplastic elastomer (J), 1-20 parts by weight of the olefinic thermoplastic resin (K) and 0.5-20 parts by weight of an organic or an inorganic foaming agent of heat-decomposition type (B) per 100 parts by weight of total sum of the olefinic thermoplastic elastomer (J) and the olefinic thermoplastic resin (K) by co-extrusion with the foaming expansion ratio of the foamed body ($X_{F2}$) of at least twofold, and wherein the foamed laminate is formed by co-extrusion of the foamable composition based on olefin ($X_3$) and the olefinic thermoplastic elastomer composition ($Z_3$) wherein the foamable composition based on olefin ($X_3$) foams by heat fusing to form the substrate layer of the foamed body ($X_{F2}$), and said olefinic thermoplastic elastomer composition ($Z_3$) is one which comprises, per 100 parts by weight of an olefinic thermoplastic elastomer (C), at least one kind of lubricant selected from the group consisting of 0.5-25 parts by weight of an organopolysiloxane (D), 0.5-10 parts by weight of a fluorine-containing polymer (E), 0.5-10 parts by weight of an antistatic agent (F), 0.01-5 parts by weight of a fatty acid amide, 0.01-5 parts by weight of a metal soap, 0.01-5 parts by weight of an ester, 0.01-5 parts by weight of calcium carbonate and 0.01-5 parts by weight of a silicate, each in a proportion given above, and further comprises a polyolefin resin (G) in an amount of 5-200 parts by weight.

29. A foamed laminate based on olefin in which a substrate layer is laminated with a non-foamed skin layer, wherein the foamed laminate is a co-extruded product in which the substrate layer and the skin layer are heat fused and the substrate layer is foamed by co-extrusion by multilayer extrusion molding machine, wherein said substrate layer comprises a foamed body ($X_{F2}$) comprising an uncrosslinked olefinic thermoplastic elastomer composition ($X_2$) comprising 100 parts by weight of an olefinic thermoplastic elastomer (J) and 1-20 parts by weight of an olefinic thermoplastic resin (K), and said skin layer comprises an olefinic thermoplastic elastomer composition (Z), wherein said olefinic thermoplastic elastomer (J) is one which is obtained by subjecting a mixture comprising 5-60 parts by weight of a polyolefin resin (j-1) and 40-95 parts by weight of an ethylene/α-olefin copolymer rubber (j-2) resulting from copolymerization of ethylene, an α-olefin and, optionally incorporated, a non-conjugated polyene, with said constituents (j-1) and (j-2) summing up to 100 parts by weight, to a dynamic heat treatment, said ethylene/α-olefin copolymer rubber (0-2) is one which has a Mooney viscosity $ML_{1+4}$ (100° C.) of 10-250 and an ethylene content of 55-95 mole % and said olefinic thermoplastic resin (K) is one which has an olefin content of 50-100 mole % and a melt flow rate (ASTM D-1238-65T, 230° C., 2.16 kg load) of 0.01-2 g/10 min., and wherein the olefinic thermoplastic elastomer composition ($X_2$) is one which has a compression set of 60% or less as determined according to JIS K 6262 (at 70° C., 22 hours) and a melt flow rate of 0.1 g/10 min. or higher as determined according to JIS K 7120 (at 230° C., 10 kg load), and wherein the foamed body ($X_{F2}$) is formed by foaming a foamable composition based on olefin ($X_3$) comprising 100 parts by weight of the olefinic thermoplastic elastomer (J), 1-20 parts by weight of the olefinic thermoplastic resin (K) and 0.5-20 parts by weight of an organic or an inorganic foaming agent of heat-decomposition type (B) per 100 parts by weight of total sum of the olefinic thermoplastic elastomer (J) and the olefinic thermoplastic resin (K) by co-extrusion with the foaming expansion ratio of the foamed body ($X_{F2}$) of at least twofold, and wherein the foamed laminate is formed by co-extrusion of the foamable composition based on olefin ($X_3$) and the olefinic thermoplastic elastomer composition (Z) wherein the foamable composition based on olefin ($X_3$) foams by heat fusing to form the substrate layer of the foamed body ($X_{F2}$), and said olefinic thermoplastic elastomer composition (Z) is one which comprises, per 100 parts by weight of an olefinic thermoplastic elastomer (C), at least one kind of lubricant (ZL) selected from the group consisting of 0.5-25 parts by weight of an organopolysiloxane (D), 0.5-10 parts by weight of a fluorine-containing polymer (E), 0.5-10 parts by weight of an antistatic agent (F), 5-200 parts by weight of a polyolefin resin (G), 0.01-5 parts by weight of a fatty acid amide, 0.01-5 parts by weight of a metal soap, 0.01-5 parts by weight of an ester, 0.01 -5 parts by weight of calcium carbonate and 0.01-5 parts by weight of a silicate, each in a proportion as given above.

30. The foamed laminate based on olefin, as claimed in any one of claims 29, to 28, wherein the olefinic thermoplastic elastomer (C) is one which is obtained by a dynamic heat treatment of a mixture comprising a crystalline polyolefin resin (c-1) and a rubber (c-2).

31. The foamed laminate based on olefin, as claimed in claim 29, 27, or 28 wherein the polyolefin resin (G) is an ultrahigh molecular weight polyolefin resin (Y).

32. The foamed laminate based on olefin, as claimed in claim 29, wherein the olefinic thermoplastic elastomer (C) is one which is obtained by subjecting a mixture comprising the crystalline polyolefin resin (c-1) and the rubber (c2) to a dynamic heat treatment in the presence of a cross-linking agent.

* * * * *